(12) United States Patent
Scherr et al.

(10) Patent No.: US 12,484,892 B2
(45) Date of Patent: Dec. 2, 2025

(54) SUTURE-BASED ASSEMBLY FOR TISSUE REPAIR, AND ASSOCIATED DEVICES AND METHODS

(71) Applicant: Altyx Medical, Inc., Evanston, IL (US)

(72) Inventors: Douglas Scherr, Scarsdale, NY (US);
Roger Goldberg, Evanston, IL (US);
Ghazaleh Rostami Nia, Lake Forest, IL (US)

(73) Assignee: ALTYX MEDICAL, INC., Evanston, IL (US)

( * ) Notice: Subject to any disclaimer, the term of this patent is extended or adjusted under 35 U.S.C. 154(b) by 945 days.

(21) Appl. No.: 17/685,678

(22) Filed: Mar. 3, 2022

(65) Prior Publication Data

US 2022/0304673 A1 Sep. 29, 2022

Related U.S. Application Data

(60) Provisional application No. 63/155,767, filed on Mar. 3, 2021.

(51) Int. Cl.
*A61B 17/04* (2006.01)
*A61B 17/06* (2006.01)

(52) U.S. Cl.
CPC .. *A61B 17/0401* (2013.01); *A61B 2017/0404* (2013.01); *A61B 2017/0409* (2013.01);
(Continued)

(58) Field of Classification Search
CPC ........ A61B 17/0401; A61B 2017/0404; A61B 2017/0409; A61B 2017/0417;
(Continued)

(56) References Cited

U.S. PATENT DOCUMENTS 3,123,077 A * 3/1964 Alcamo ........... A61B 17/06166
606/228
7,063,715 B2 6/2006 Onuki et al.
(Continued)

FOREIGN PATENT DOCUMENTS

EP 1908424 A1 4/2008
EP 2149338 A1 2/2010
(Continued)

OTHER PUBLICATIONS

International Search Report and Written Opinion mailed Jul. 26, 2022 in International Patent Application No. PCT/US22/18653, 15 pages.

(Continued)

*Primary Examiner* — Julian W Woo
(74) *Attorney, Agent, or Firm* — Perkins Coie LLP

(57) ABSTRACT

The present technology is directed to systems, methods, and devices for anchoring suture devices into a target patient tissue to treat a medical condition. For example, in some embodiments the present technology includes a tissue-support system including an applicator device and a suture device. The applicator device is configured to deploy and anchor the suture device in a target tissue. In some embodiments, the suture device is deployed such that an anchor of the suture device is positioned external to the tissue it is anchored to.

15 Claims, 27 Drawing Sheets

(52) U.S. Cl.
CPC .............. *A61B 2017/0417* (2013.01); *A61B 2017/0464* (2013.01); *A61B 2017/06176* (2013.01)

(58) Field of Classification Search
CPC .. A61B 2017/0464; A61B 2017/06176; A61B 17/0487; A61B 17/0625; A61B 2017/0412; A61B 2017/0427
See application file for complete search history.

(56) References Cited

U.S. PATENT DOCUMENTS

| | | | |
|---|---|---|---|
| 7,736,378 B2 | 6/2010 | Maahs et al. | |
| 7,951,158 B2 * | 5/2011 | Catanese, III | A61B 17/0469 606/151 |
| 7,976,554 B2 | 7/2011 | Newell et al. | |
| 8,057,386 B2 | 11/2011 | Aznoian et al. | |
| 8,118,820 B2 * | 2/2012 | Stokes | A61B 17/0469 606/139 |
| 8,388,653 B2 | 3/2013 | Nobis et al. | |
| 8,398,660 B2 * | 3/2013 | Chu | A61B 17/0491 606/144 |
| 8,863,748 B2 | 10/2014 | Kuroda et al. | |
| 8,944,990 B2 | 2/2015 | Hamel et al. | |
| 9,044,220 B2 | 6/2015 | Chu | |
| 9,408,602 B2 | 8/2016 | Chu | |
| 9,833,228 B2 | 12/2017 | Theobald | |
| 10,299,828 B2 | 5/2019 | Goldberg et al. | |
| 10,357,284 B2 | 7/2019 | Mujwid et al. | |
| 10,398,431 B2 | 9/2019 | Mujwid et al. | |
| 10,456,230 B2 | 10/2019 | Schuchardt et al. | |
| 10,548,590 B2 | 2/2020 | Harris et al. | |
| 10,799,235 B2 | 10/2020 | Teague et al. | |
| 2003/0216613 A1 | 11/2003 | Suzuki et al. | |
| 2003/0233108 A1 * | 12/2003 | Gellman | A61B 17/0469 606/144 |
| 2004/0138682 A1 | 7/2004 | Onuki et al. | |
| 2005/0251153 A1 | 11/2005 | Sakamoto et al. | |
| 2006/0265042 A1 | 11/2006 | Catanese, III et al. | |
| 2010/0211086 A1 | 8/2010 | Ewers et al. | |
| 2012/0101522 A1 | 4/2012 | Megaro et al. | |
| 2014/0088621 A1 | 3/2014 | Krieger et al. | |
| 2018/0035996 A1 | 2/2018 | Goss | |
| 2018/0228487 A1 | 8/2018 | Smith | |
| 2019/0298344 A1 | 10/2019 | Mujwid et al. | |
| 2023/0104807 A1 | 4/2023 | Scherr et al. | |

FOREIGN PATENT DOCUMENTS

| | | |
|---|---|---|
| JP | S5252389 | 4/1977 |
| JP | 200424618 A1 | 1/2004 |
| WO | 9525468 A1 | 9/1995 |
| WO | WO2008069816 | 6/2008 |
| WO | 2010085793 A2 | 7/2010 |

OTHER PUBLICATIONS

International Search Report and Written Opinion mailed Jul. 14, 2021 in International Patent Application No. PCT/US21/20129, 16 pages.
Examination Report mailed Mar. 27, 2024 in Canadian Patent Application No. 3173298, 7 pages.
Extended European Search Report mailed Mar. 12, 2025 in European Patent Application No. 22764029.9, 11 pages.
Extended European Search Report mailed Feb. 13, 2024 in European Patent Application No. 21761831.3, 11 pages.
Office Action mailed Oct. 8, 2024 in Japanese Patent Application No. 2022-551719, 18 pages, English translation.
Partial Supplementary European Search Report mailed Dec. 19, 2024 in European Patent Application No. 22764029.9, 12 pages.
Examination Report mailed May 1, 2025 in Canadian Patent Application No. 3173298, 5 pages.
Office Action mailed May 30, 2025 in Japanese Patent Application No. 2022-551719, 6 pages, English translation.

* cited by examiner

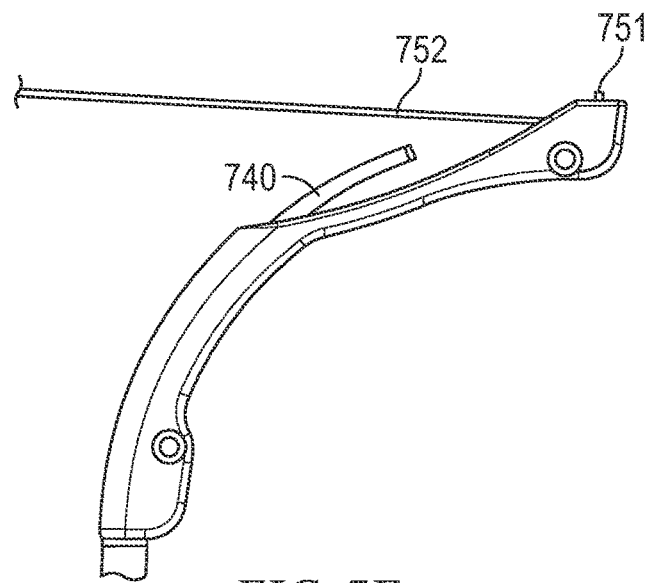
FIG. 7F
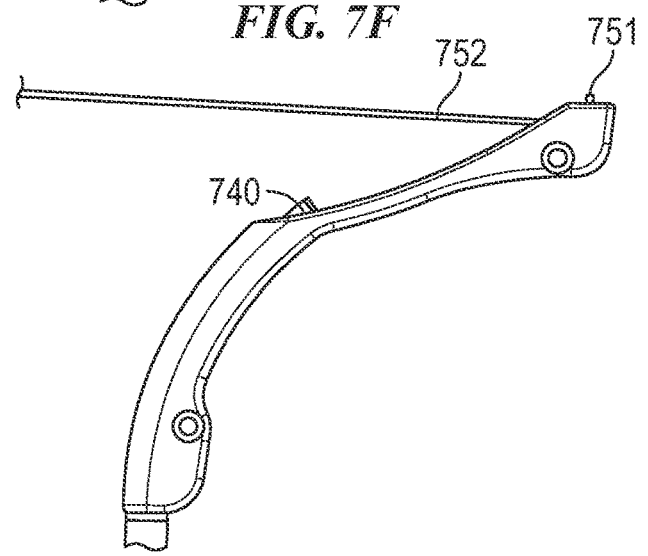
FIG. 7G
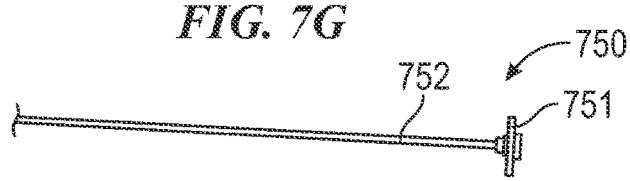
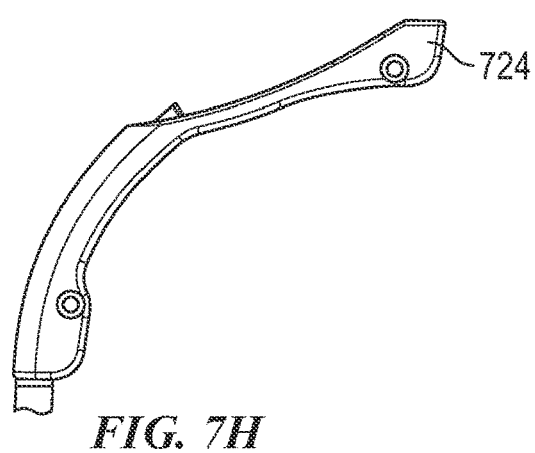
FIG. 7H

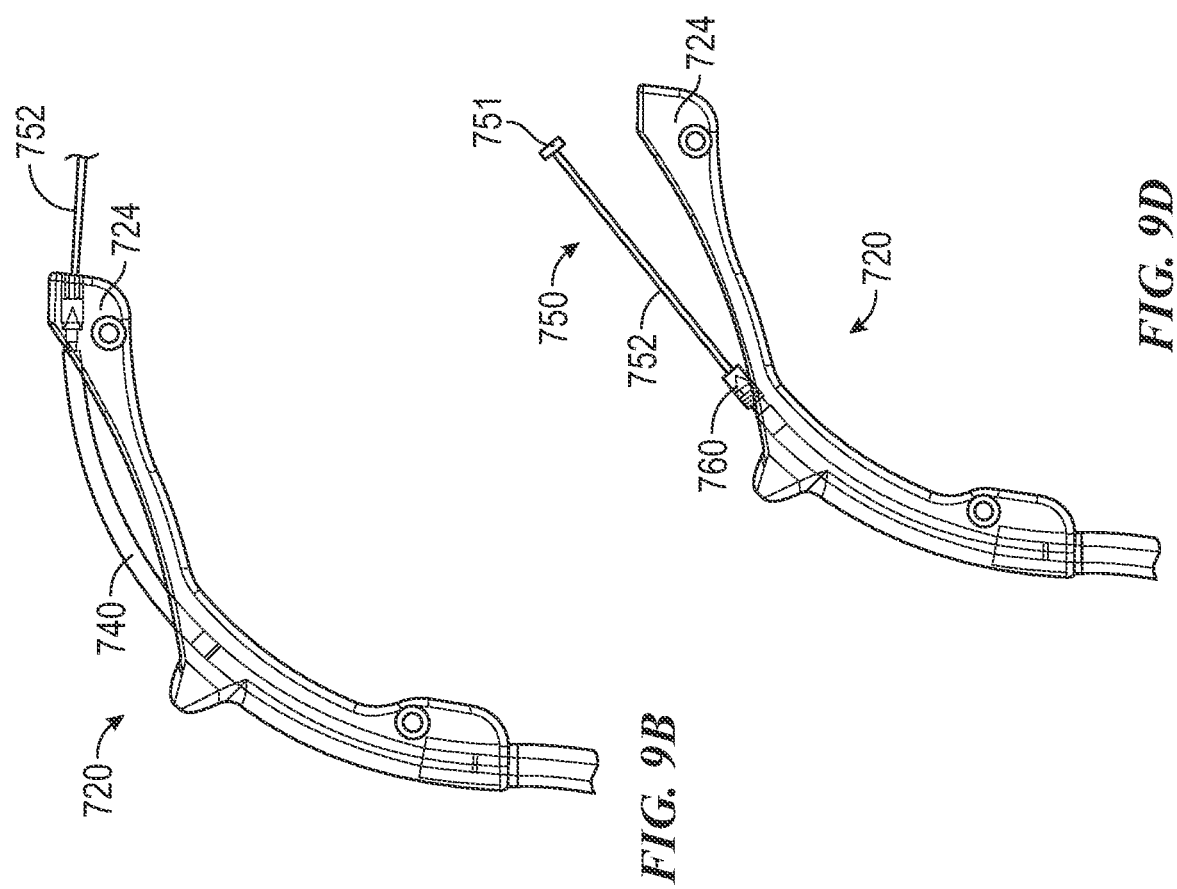
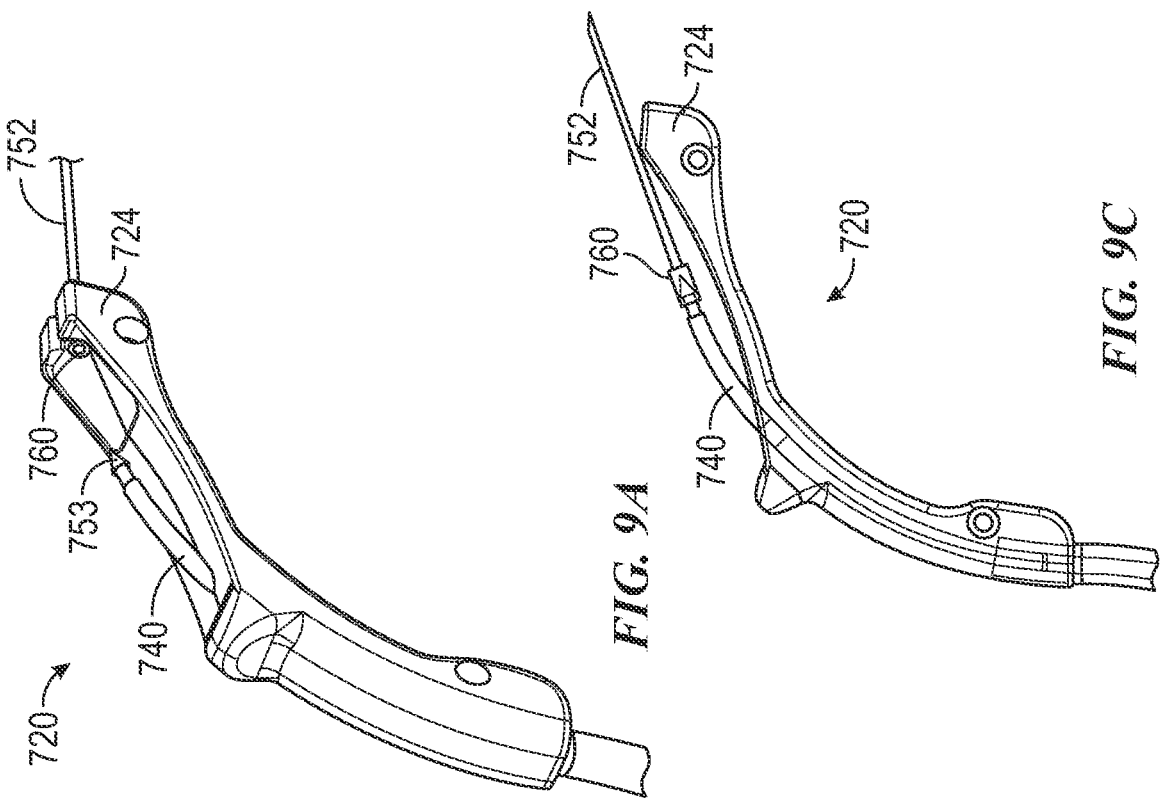

SUTURE-BASED ASSEMBLY FOR TISSUE REPAIR, AND ASSOCIATED DEVICES AND METHODS

CROSS-REFERENCE TO RELATED APPLICATION

This application claims the benefit of U.S. Provisional Application No. 63/155,767, filed Mar. 3, 2021, the disclosure of which is incorporated by reference herein in its entirety.

TECHNICAL FIELD

The present technology is generally directed to systems, devices, and methods for tissue repair and, in particular, to systems, devices, and methods for suture-based repair for treating urinary incontinence and other patient conditions.

BACKGROUND

Stress urinary incontinence is a condition characterized by unintentional voiding events (e.g., loss of urine) generally associated with physical movement, activity, or other stresses that may put added pressure on the bladder. In some instances, urinary incontinence occurs if the pelvic floor muscles and connective tissue fail to properly support the bladder neck and/or mid-urethra when pressure is exerted on the bladder. Such pressure can be exerted by the diaphragm during normal breathing, by increased intra-abdominal pressure (e.g., during coughing), or the like. The increased abdominal pressure pushes the urethra downward relative to its normal position, causing it to lose its seal and permitting urine to escape. Of course, urinary incontinence can also be caused by other physiological factors in addition to or instead of failure of the pelvic floor muscles and connective tissue to properly support the bladder neck and/or mid-urethra, such as urethral prolapse.

Primary treatment for urinary incontinence typically includes non-surgical approaches. However, for the many patients who fail to respond adequately to non-surgical approaches, surgical repair may be recommended. Conventional surgical approaches for treating urinary incontinence include implanting a mesh or sling into the patient. The device is attached and suspended from either the lower abdominal wall, the rectus sheath, or other anatomical support structures. The device may then be attached to the urethra and/or tissue below the urethra (e.g., a sub-urethral sling) to provide support to the urethra. While such surgical interventions may help reduce involuntary voiding events, there are numerous complications associated with meshes and slings, including, but not limited to, injury to the pelvic organs, bleeding and urinary tract infection, chronic pain, and mesh erosion. Accordingly, a need exists for improved treatments for urinary incontinence and other disorders.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

FIGS. 7A-7H illustrate yet another tissue-support system configured in accordance with select embodiments of the present technology.

FIGS. 9A-9D illustrate an additional suture-based application using the tissue-support system of FIGS. 7A-7H in accordance with embodiments of the present technology.

DETAILED DESCRIPTION

Figure 1A:
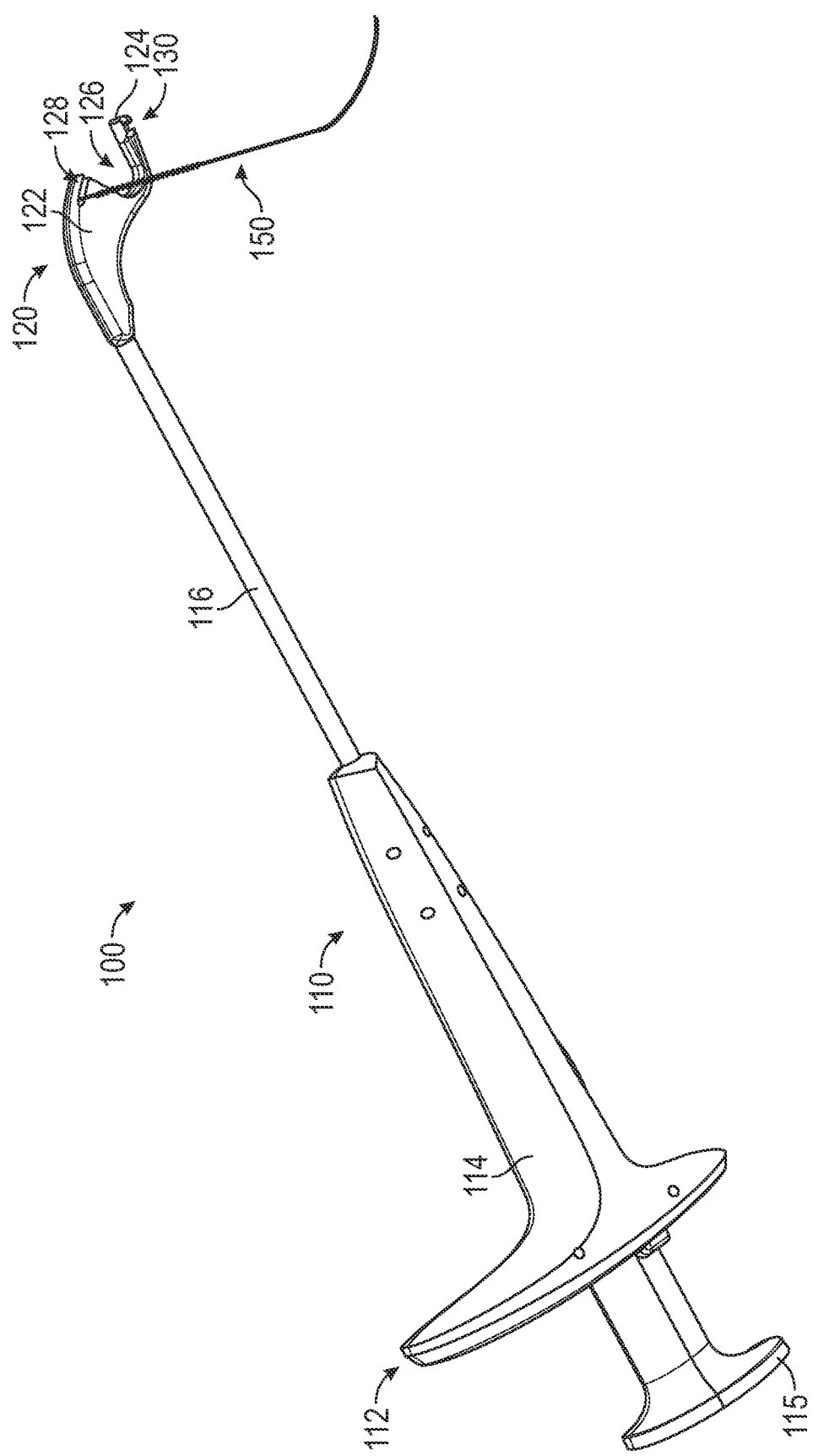
FIG. 1A illustrates a tissue-support system including an applicator device and a suture device configured in accordance with select embodiments of the present technology.

The present technology is directed to systems, methods, and devices for anchoring suture devices into target patient tissue to treat a medical condition. For example, in some embodiments the present technology includes a tissue-support system including an applicator device and a suture device. The applicator device is configured to deploy and anchor the suture device in a target tissue. The applicator device can include a proximal complex having a handle and an actuator and a distal complex configured to contact the target tissue. In some embodiments, the distal complex includes a proximal portion, a distal portion, and a gap defined between the proximal portion and the distal portion. The distal complex can further include a needle positioned within the proximal portion that releasably carries the suture device. When the target tissue is positioned within the gap, the needle can be advanced through the target tissue from the proximal portion to the distal portion by actuating the actuator. Because the needle carries the suture device, at least a portion of the suture device also passes through the target tissue. The needle can then release the suture device and be retracted, leaving the suture device anchored to the target tissue. As a result, the anchor is positioned external to the target tissue, and at least a portion of the suture element passes through the target tissue. As described in detail throughout this Detailed Description, positioning an anchor of a suture device external to the target tissue in accordance with the present technology is expected to provide several advantages relative to positioning an anchor within a target tissue. For example, positioning the anchor of a suture device external to the target tissue reduces the invasiveness of the suture while increasing the stability of the anchor.

The present technology further includes methods of anchoring a suture device into a target patient tissue. In some embodiments, for example, such methods may include advancing an applicator device carrying the suture device toward target tissue of the patient. The suture device may include an anchor and a suture element, and the applicator device may include a distal complex having a proximal portion and a distal portion, with the proximal portion having a needle carrying the anchor. The target tissue can be positioned within a gap defined between the proximal portion and the distal portion, and the needle can subsequently be advanced from the proximal portion toward the distal portion. Advancing the needle causes the needle to (a) enter the target tissue at a first point adjacent the proximal portion, (b) create a passageway through the target tissue, and (c) exit the target tissue at a second point adjacent the distal portion. As it advances, the needle also carries the anchor and at least a portion of the suture element from the first point to the second point through the passageway. With a portion of the needle outside the target tissue at the second point, the anchor can be deployed from the needle. The needle can then be retracted back through the passageway from the distal portion of the distal complex into the proximal portion of the distal complex. After retracting the needle, the anchor remains external to the target tissue at the second point, and a portion of the suture element extends through the passageway between the first point and the second point.

Further aspects and advantages of the devices, methods, and uses will become apparent from the ensuing description that is given by way of example only.

The terminology used in the description presented below is intended to be interpreted in its broadest reasonable manner, even though it is being used in conjunction with a detailed description of certain specific embodiments of the present technology. Certain terms may even be emphasized below; however, any terminology intended to be interpreted in any restricted manner will be overtly and specifically defined as such in this Detailed Description section. Additionally, the present technology can include other embodiments that are within the scope of the examples but that are not described in detail with respect to FIGS. 1A-18.

Reference throughout this specification to "one embodiment" or "an embodiment" means that a particular feature, structure, or characteristic described in connection with the embodiment is included in at least one embodiment of the present technology. Thus, the appearances of the phrases "in one embodiment" or "in an embodiment" in various places throughout this specification are not necessarily all referring to the same embodiment. Furthermore, the particular features or characteristics may be combined in any suitable manner in one or more embodiments.

Reference throughout this specification to relative terms such as, for example, "generally," "approximately," and "about" are used herein to mean the stated value plus or minus 10%. The term "substantially" or grammatical variations thereof refers to at least about 50%, for example, 75%, 85%, 95%, or 98%.

The headings provided herein are for convenience only and do not interpret the scope or meaning of the claimed present technology.

A. Select Embodiments of Tissue Support Systems

FIG. 1A illustrates a tissue-support system 100 ("the system 100") for performing tissue-pexy procedures and configured in accordance with select embodiments of the present technology. The system 100 includes an applicator device 110 (which can also be referred to as a deployment device 110, an applicator 110, etc.) and a suture device 150 removably carried by the applicator device 110. The applicator device 110 includes a proximal complex 112, a distal complex 120, and a shaft 116 extending therebetween.

The proximal complex 112 is configured to be gripped by a user (e.g., a physician), and, during operation, can be manipulated to deploy the suture device 150 from the distal complex 120. For example, the proximal complex 112 can include a handle 114 and an actuator or trigger 115 (e.g., shown as a plunger, although as described below the actuator 115 can have a different suitable form). In operation, compressing the actuator 115 relative to the handle 114 (e.g., actuating the actuator 115) deploys the suture device 150 from the distal complex 120 and into a target patient tissue, as described below. In some embodiments, the proximal complex 112 may further include a button or other feature that enables a user to abort a deployment procedure prior to deploying the suture device 150 from a deployment needle.

The distal complex 120 (which can also be referred to as a "head" of the applicator device 110) can include a proximal portion 122 and a distal portion 124, which projects from the proximal portion 122 as an extension, appendage, promontory, etc. The proximal portion 122 and the distal portion 124 are at least partially separated by a gap or recess 126. As described in detail below, the gap 126 can be configured to receive patient tissue to facilitate deployment of the suture device 150 into the received tissue. Accordingly, although shown as having a u-shape, the gap 126 can be designed to accommodate (e.g., receive) any target tissue, and therefore can have other suitable shapes depending on the shape of the target tissue. The proximal portion 122 can further include an internal lumen or compartment (not shown) that can house and retain a needle (e.g., a needle 140, shown in FIG. 1D). The proximal portion 122 can further include a slit 128 that permits the suture device 150 to extend from within the internal lumen of the proximal portion 122 to an environment external to the applicator device 110. The distal portion 124 can include a slot 130 (e.g., an aperture, port, opening, etc.). As shown in FIG. 1A, the slot 130 is not fully enclosed by the distal portion 124. Rather, at least one side of the slot 130 is open, which permits the suture device 150 to pass through the slot 130 during a deployment procedure.

The shaft 116 (which can also be referred to as an elongated neck, a conduit, an extender, etc.) can be designed to permit the distal complex 120 to access the target tissue. For example, in embodiments in which the applicator device 110 is designed for transvaginal retropubic urethropexy, the shaft 116 can be designed to extend transvaginally into the retropubic space (e.g., through an incision in the vaginal wall). In some embodiments, the shaft 116 can be at least partially flexible to facilitate navigation of the device 110 to and/or toward the target tissue. In other embodiments, the shaft 116 can be rigid. In some embodiments, the shaft 116 has at least one flexible segment and at least one rigid segment. The shaft 116 can also optionally have a curved shape, and/or have one or more curved regions, to further facilitate insertion of the distal complex 120 and the shaft 116 into a patient.

Figure 1B:
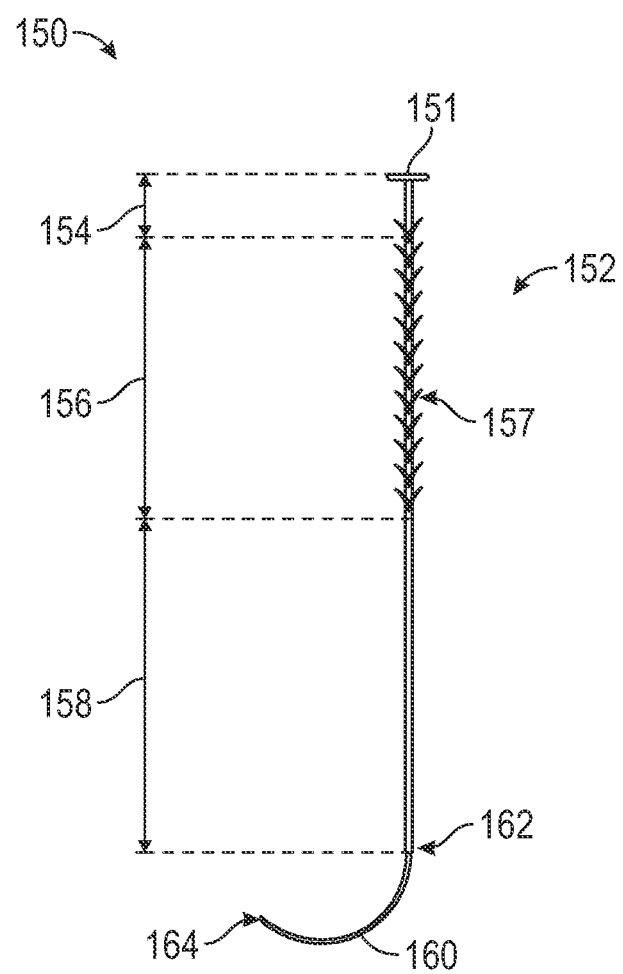
FIG. 1B illustrates additional features of the suture device shown in FIG. 1A.

FIG. 1B illustrates additional features of the suture device 150. In particular, the suture device 150 can include an anchor 151 and a suture element 152. The anchor 151 can be a t-shaped anchor (e.g., a "t-tag"), and may be composed of a biocompatible material such as surgical stainless steel, titanium, nitinol, or the like. In other embodiments, the anchor 151 is composed of a resorbable material (e.g., Polydioxanone). The size of the anchor 151 can be selected based on the anatomical target. For example, for urethropexy procedures in which the anchor 151 will be deployed in the periosteum of the pubic bone, the anchor 151 can have a length between about 3 mm and about 16 mm, or between about 3 mm and about 12 mm, or between about 3 mm and about 9 mm, or about 6 mm. The anchor 151 can have any suitable cross-sectional shape, such as round, rectangular, etc. The anchor 151 can have a diameter of between about 0.4 mm and 2 mm, such as between about 0.4 mm and 1 mm, or about 0.8 mm. Of course, the anchor 151 can have dimensions outside the foregoing ranges and values, depending on the desired application and materials that the anchor 151 is composed of.

The suture element 152 can include a suture thread or strand. The suture element 152 can be composed of a synthetic or natural material, can be adsorbable or non-absorbable, and/or can be elastomeric. As a particular non-limiting example, the suture element 152 can be a resorbable suture composed of Polydioxanone. The suture element 152 can be divided into two or more segments. For example, in the illustrated embodiment, the suture element 152 includes a first smooth segment 154, a second smooth segment 158, and a barbed segment 156 between the first smooth segment 154 and the second smooth segment 158. The first smooth segment 154 and the second smooth segment 158 can be free of, or substantially free, of any barbs (e.g., any clinically significant protrusions, hooks, or the like that would hinder the suture from passing through tissue). Accordingly, as used herein, the term "smooth segment" refers to a portion of a suture that does not include any clinically significant barbs. The barbed segment 156 can include superior facing barbs 157 that face toward the anchor 151 and are configured to prevent or reduce tissue from slipping in a direction away from the anchor 151 along the suture element 152. Accordingly, as used herein, the term "barbed segment" refers to a portion of a suture that includes at least one clinically significant barb (e.g., a barb that can be used to secure the suture to patient tissue).

The suture element 152 can have a total length of between about 50 mm and 200 mm, such as between about 50 mm and 150 mm, or about 100 mm. In some embodiments, the first smooth segment 154 can have a length between about 5 mm and about 20 mm, such as between about 5 mm and 15 mm, or about 10 mm. The second smooth segment 158 can have a length between about 25 mm and 100 mm, such as between about 25 mm and 75 mm, or about 50 mm. The barbed segment 156 can have a length between about 20 mm and 80 mm, such as between about 20 mm and 60 mm, or about 40 mm. The suture element 152 may have a diameter of between about 0.2 mm and 1 mm in diameter, such as between about 0.3 mm and 0.8 mm, or about 0.5 mm. Of course, the foregoing dimensions are provided by way of example only, and the suture element 152 can have dimensions beyond those described herein.

The suture element 152 is couped to and extends from the anchor 151. For example, in the illustrated embodiment the first smooth segment 154 is coupled to and extending from the anchor 151. In some embodiments, the end of the first smooth segment 154 can be crimped, glued, stapled, welded, tied, or otherwise coupled to the anchor 151. In other embodiments, a portion of the first smooth segment 154 can be looped around the anchor 151 and secured to itself. Although shown as a single suture element 152 extending from the anchor 151, some embodiments may include a plurality of suture elements 152 extending from the anchor 151, with each individual suture element of the plurality of suture elements 152 including a first smooth segment 154, a second smooth segment 158, a barbed segment 156, and a needle 160.

The suture element 152 can also be coupled to a needle 160 at an end opposite its connection to the anchor 151. The needle 160 can have generally curved or arcuate shape that terminates in a beveled or pointed tip portion 164 configured to pierce tissue. The needle 160 can be composed of any suitable material (e.g., stainless steel), and may have a tapered or constant diameter along its length. A second end portion 162 opposite the tip portion 164 can be coupled to the suture element 152 (e.g., at a distal end of the second smooth segment 158). The needle 160 can be coupled to the suture element 152 via any suitable process, such as swaging, crimping, gluing, stapling, welding, tying, or the like. As described in detail below with reference to FIGS. 2A-2J, the needle 160 can be used to puncture patient tissue and pull the suture element 152 therethrough.

In some embodiments, the suture device 150 may have a configuration other than a thin strand-like material. For example, in some embodiments, the suture element 152 can be a strap of any width such as, but not limited to, a 1 cm wide strap made of silicone, ethylene-vinyl acetate (EVA), or other suitable material. The strap may or may not include barbs on its surface intended to grip surrounding tissues. One end of the strap can be connected to the anchor 151, and the opposite end of the strap may be attached to a target tissue directly with sutures, or with an integrated hook or clip. Accordingly, although described in the context of a suture, the present technology also includes utilizing a strap to support tissues.

Figure 1D:
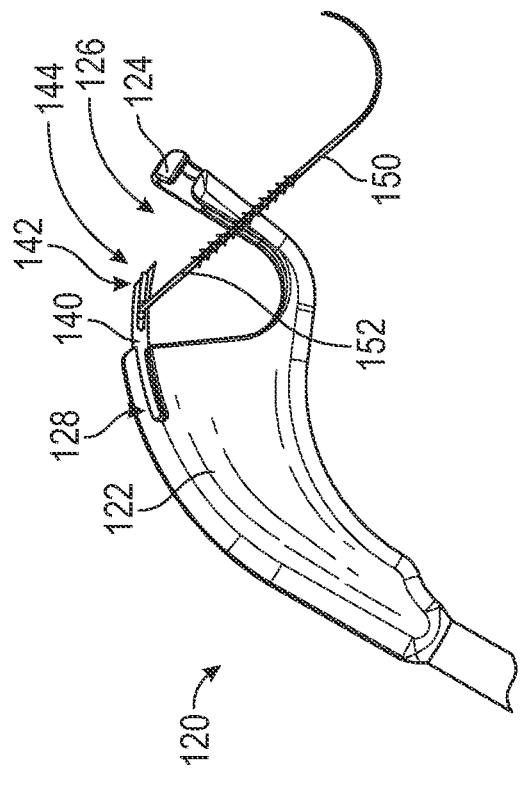
FIGS. 1C-1F illustrate various stages of operating the tissue-support system shown in FIG. 1A to deploy the suture device from the applicator device.
Figure 1F:
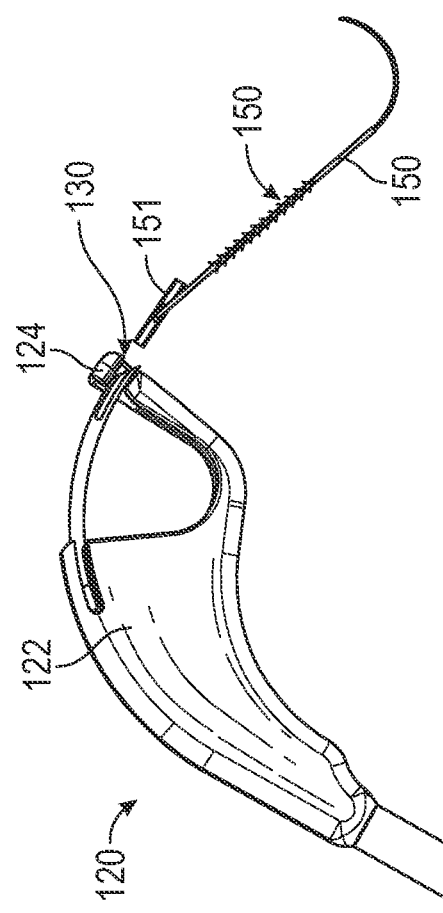
Figure 1C:
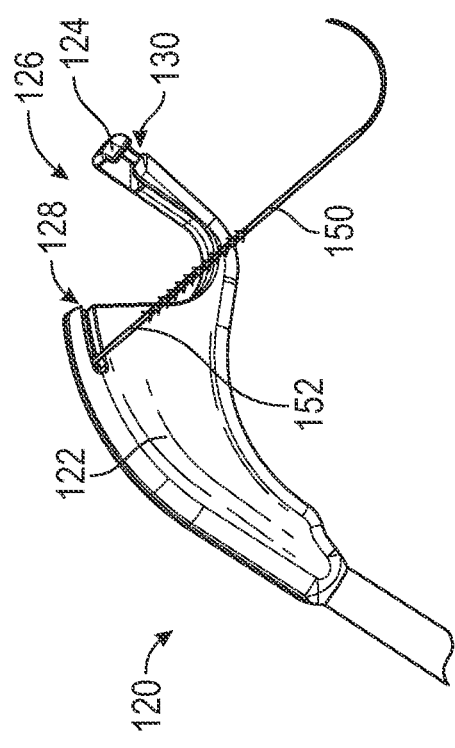

FIGS. 1C-1F are enlarged views of the distal complex 120 of the applicator device 110 and illustrate various stages of deploying the suture device 150 therefrom. FIG. 1C, for example, illustrates the distal complex 120 in a first (e.g., baseline) configuration. The distal complex 120 is in the baseline configuration after the suture device 150 has been loaded into the applicator device 110 (e.g., by inserting the anchor 151 into the needle 140; not visible in FIG. 1C) and while the distal complex 120 is being advanced toward a target tissue. The suture element 152 of the suture device 150 extends outwardly from the proximal portion 122 via the slit 128.

FIG. 1D illustrates a first stage during suture deployment, e.g., caused by a user beginning to compress the actuator 115 of the proximal complex 112 (FIG. 1A). As shown in FIG. 1D, the needle 140 begins to advance from within the hollow lumen of the proximal portion 122 and toward the distal portion 124 (e.g., the needle 140 advances across the gap 126). In some embodiments, a pushrod (not shown) extends between the actuator 115 and the needle 140, such that compressing the actuator 115 causes the pushrod to exert a force on the needle 140 and push the needle 140 distally. In other embodiments, the needle is directly coupled to the actuator 115, and/or the applicator device 110 incorporates another deployment mechanism (e.g., spring-loaded, hydraulic, etc.) for deploying the needle 140.

The needle 140 is configured to at least partially carry the suture device 150. For example, the anchor 151 of the suture device 150 can be positioned within a hollow tip portion 144 of the needle 140. The needle 140 can include a needle slit or gap 142 that permits the suture element 152 of the suture device 150 to exit the hollow tip portion 144. In some embodiments, the slit 142 is omitted and the suture element 152 extends distally from the hollow tip portion 144 (e.g., out the distal tip of the needle 140). However, including the slit 142 is expected to be beneficial because it reduces the likelihood that the suture element 152 will be damaged (e.g., nicked, sheared, etc.) by the relatively sharp distal tip of the needle 140.

Figure 1E:
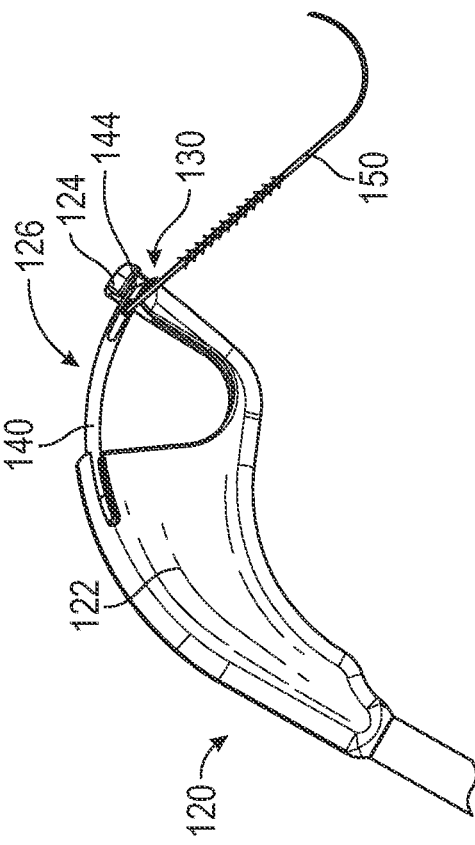

FIG. 1E illustrates a second stage during suture deployment, e.g., caused by a user further compressing the actuator 115 of the proximal complex 112 (FIG. 1A). Relative to FIG. 1D, the needle 140 has continued to advance across the gap 126 (while carrying the suture device 150) until the hollow tip portion 144 is positioned within or at least proximate the slot 130 within the distal portion 124. As shown in FIG. 1F, the suture device 150 can then be deployed from the needle 140, e.g., by a user further compressing the actuator 115. In some embodiments, the actuator 115 must be fully actuated twice (e.g., fully compressed a first time to advance the needle 140 to the slot 130, and fully compressed a second time to deploy the suture device 150 from the needle 140) to enable a physician to confirm the needle path was appropriate before deploying the suture device 150. Once the suture device 150 is deployed from the needle 140, the needle 140 can be retracted back within the proximal portion 122. Although various stages of deployment are depicted in FIGS. 1D-1F, one skilled in the art will appreciate that the advancement of the needle 140 can be a continuous process such that there are a plurality (e.g., infinite) number of intermediate stages not depicted.

FIGS. 2A-2J illustrate various stages of a procedure for using the system 100 to deploy the suture device 150 into patient tissue to provide support. In particular, FIGS. 2A-2J illustrate a procedure for treating female stress urinary incontinence by fixing periurethral vaginal tissue to the periosteum of the pubic bone, therefore limiting urethral hypermobility. Of course, the system 100 can be used to perform other tissue-supporting procedures, and is not limited to any particular medical procedure unless expressly noted.

Figure 2A:
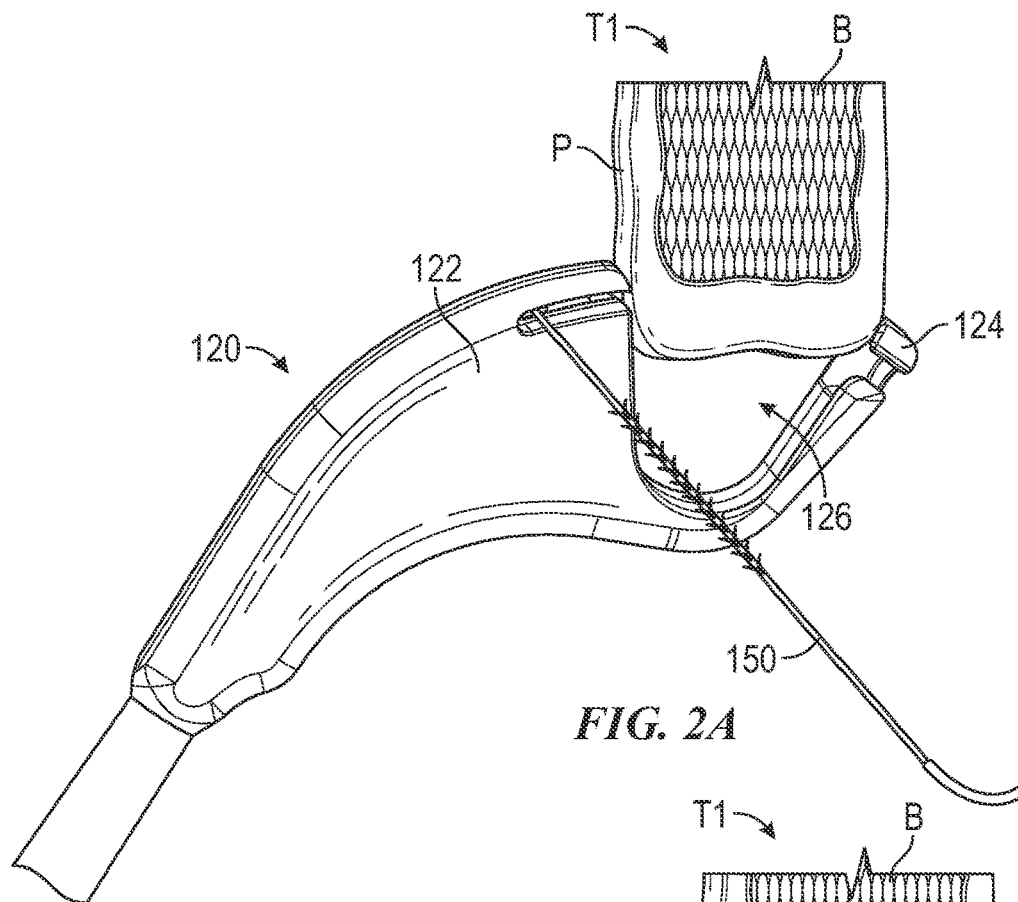
FIGS. 2A-2J illustrate various stages of an operation of performing a tissue-pexy procedure using the tissue-support system of FIG. 1A, and in accordance with select embodiments of the present technology.

Referring first to FIG. 2A, the distal complex 120 of the applicator device 110 is advanced into the retropubic space and toward a target tissue T1 (e.g., a pubic bone), which in the illustrated embodiment is composed of bone B and periosteum P. The applicator device 110 can be advanced toward the retropubic space via a small incision in the vaginal wall that permits the shaft 116 (FIG. 1A) and distal complex 120 to extend from the vagina into the retropubic space. The distal complex 120 can be advanced until the desired portion of the target tissue T1 is positioned within the gap 126 between the proximal portion 122 and the distal portion 124 of the distal complex 120. Of note, the shape of the gap 126 can be designed to limit the depth that the target tissue T1 can extend into the gap 126 which, as described below, advantageously enables the needle and suture device to pass through the periosteum P rather than the bone B. Accordingly, the shape of the gap 126 may be different depending on the structure of the target tissue T1.

Figure 2B:
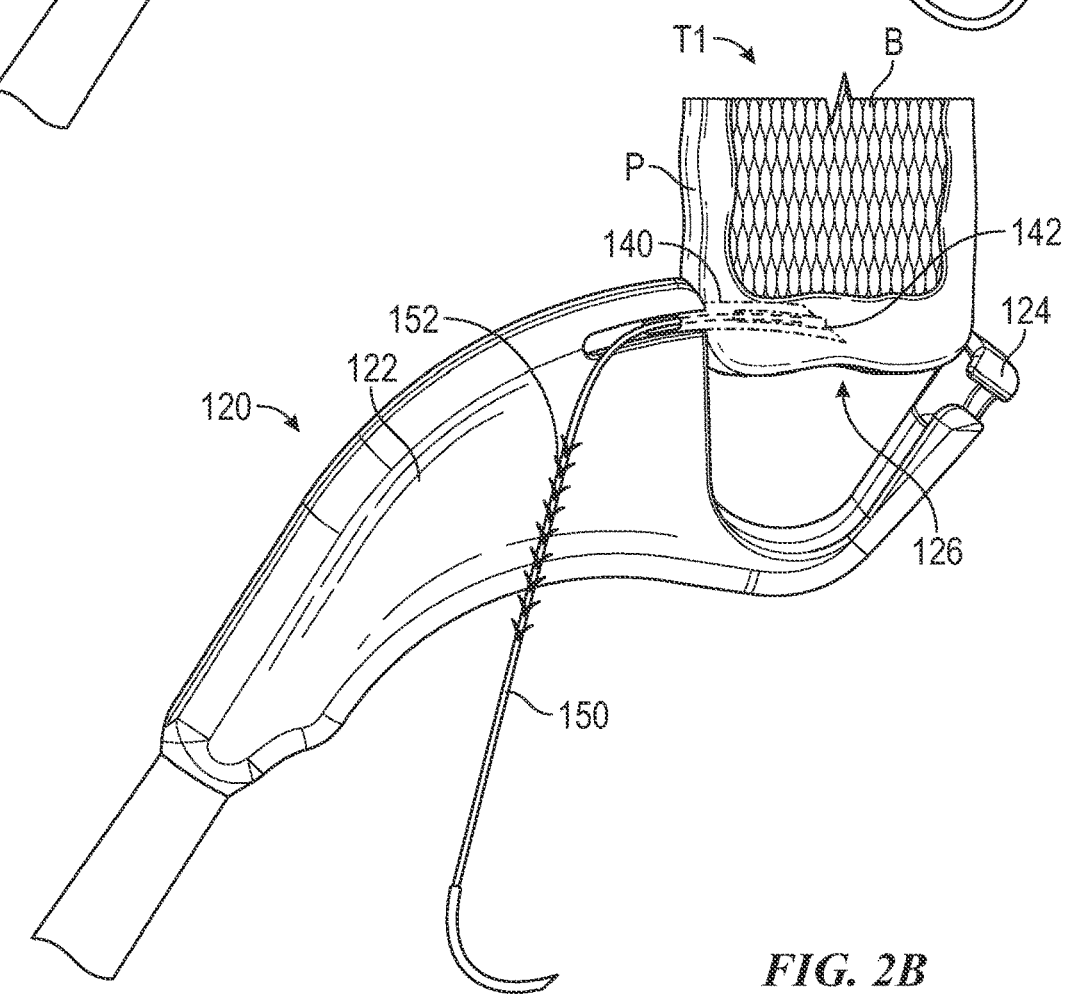
Figure 2C:
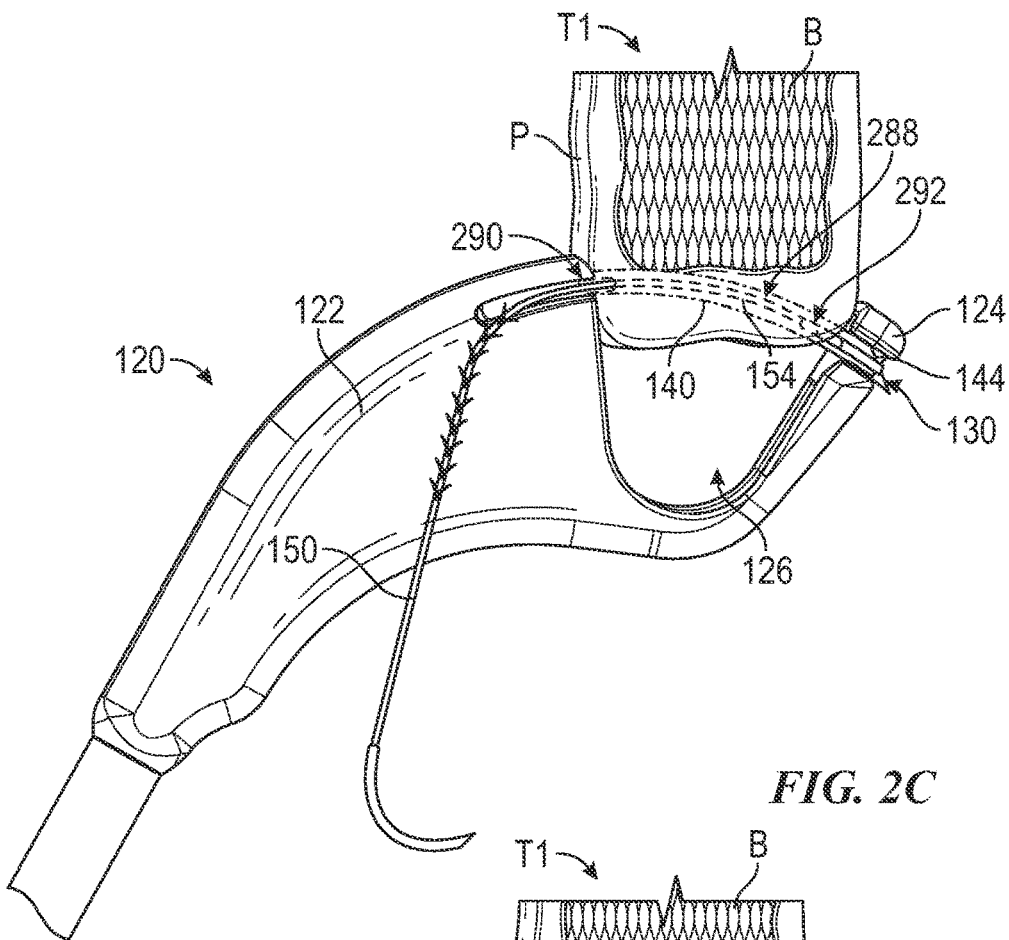
Figure 2D:
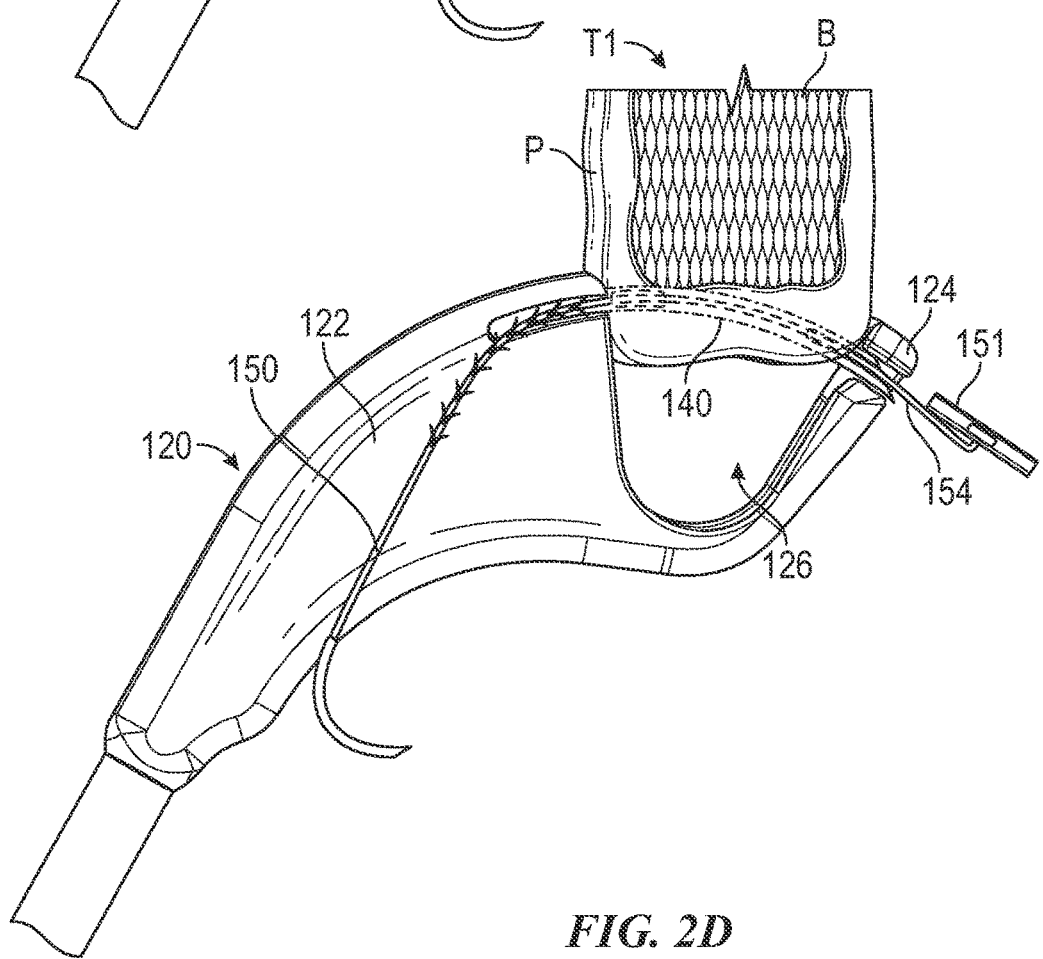

With the target tissue T1 positioned within the gap 126, a user can compress the actuator 115 to deploy the suture device 150 into the target tissue T1. FIGS. 2B-2D correspond to the various stages of needle advancement shown in FIGS. 1D-1F, but illustrate the needle 140 advancing through the target tissue A. Of note, because the gap 126 is configured to limit the distance that the distal complex 120 can be advanced over the target tissue A, the needle 140 advances through the periosteum P while avoiding contact with the bone B.

As the needle 140 advances through the periosteum P, a portion of the suture device 150 is also pulled through the periosteum P. For example, as previously described, the anchor 151 (not shown in FIG. 2B) is carried within the hollow tip portion 144 of the needle 140 and the suture element 152 extends outwardly via the slit 142. Accordingly, as the needle 140 advances through the periosteum P, it carries the anchor 151 with it. Moreover, because the anchor 151 is connected to the first smooth segment 154 of the suture element 152, the first smooth segment 154 is also pulled through the periosteum P external to, but along substantially the same pathway as, the needle 140 (best seen in FIG. 2C). The absence of barbs from the first smooth segment 154 permits the suture element 152 to be pulled through the passageway through the periosteum P created by the needle 140.

As shown in FIG. 2C, the needle 140 is advanced until the hollow tip portion 144 engages the slot 130 on the distal portion 124. This ensures the hollow tip portion 144 of the needle 140 has exited the periosteum P. Accordingly, in the configuration shown in FIG. 2C, the needle 140 extends through a passageway 288 created in the periosteum P between a first (e.g., insertion) point or region 290 adjacent the proximal portion 122 and a second (e.g., exit) point or region 292 adjacent the distal portion 124. As a result, the suture device 150 also extends through the passageway 288 created through the periosteum P between the insertion point 290 and the exit point 292. With the needle extending through the periosteum P, a user can then deploy the anchor 151 from the needle 140, shown in FIG. 2D (e.g., by further compressing the actuator 115, as previously described).

Figure 2E:
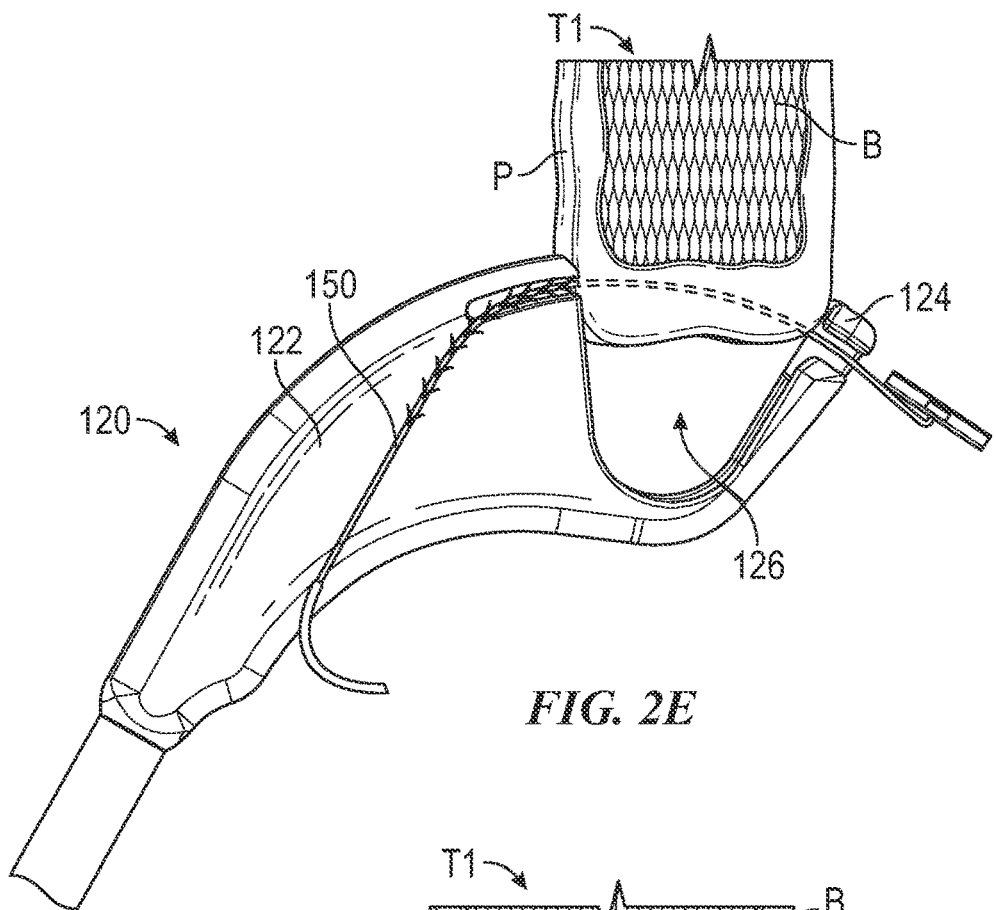

Referring to FIGS. 2D and 2E together, once the anchor 151 has been deployed from the needle 140, the needle 140 can be retracted back into the proximal portion 122 of the distal complex 120. This includes retracting the needle 140 through the passageway 288 it created in the periosteum P during needle advancement. Of note, because the anchor 151 was deployed from the needle 140, the suture device 150 is no longer coupled to the needle 140. Accordingly, the suture device 150 remains within the periosteum P as the needle 140 is retracted back into the proximal portion 122. The applicator device 110 can then be removed from the patient, leaving the suture device 150 secured to the periosteum P.

Figure 2F:
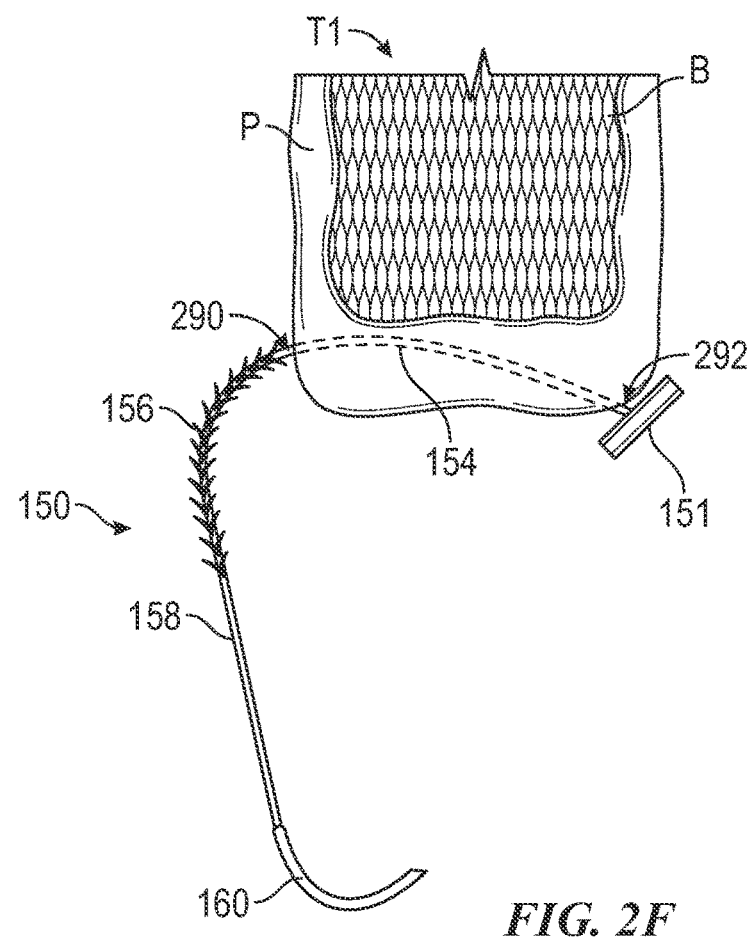
Figure 2G:
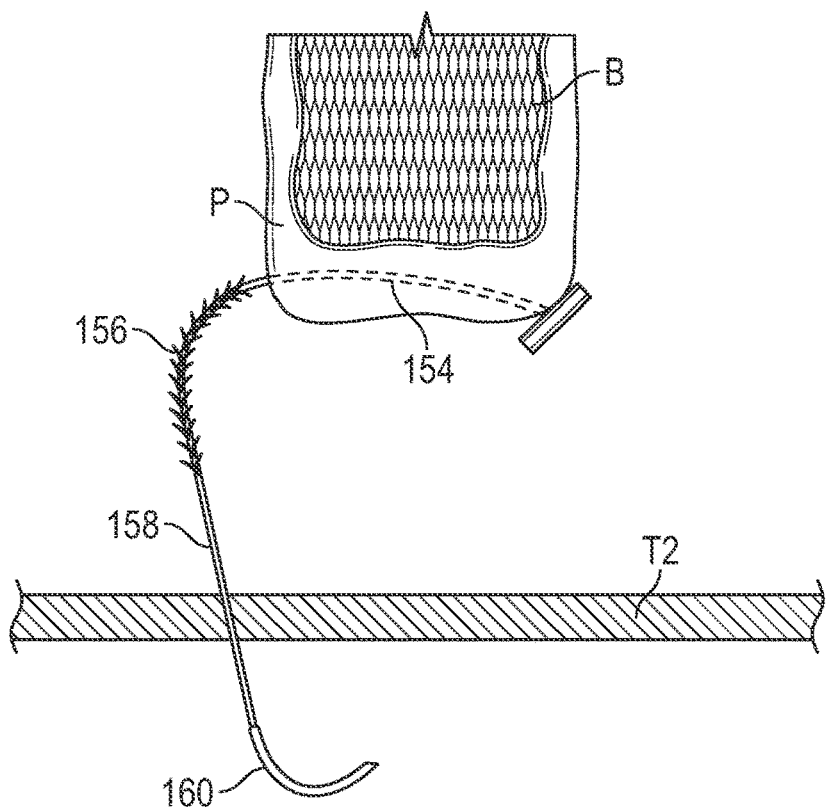

FIG. 2F illustrates the suture device 150 secured to the periosteum P following removal of the applicator device 110. As illustrated, a portion of the suture device 150 (e.g., the first smooth segment 154) extends through the periosteum P between the first point 290 and the second point 292 along the passageway 288. The anchor 151 is positioned external to, but abutting against, the second point 292 and prevents the suture device 150 from being dislodged from the periosteum P. That is, the suture device 150 is anchored to the periosteum P by virtue of being threaded through the periosteum P, but the anchor 151 is not positioned within the periosteum P itself. Without being bound by theory, this is expected to be advantageous because it minimizes the portion of the suture device 150 that is positioned within the periosteum P, and does not require anchoring the suture device 150 to the bone B, which may cause patient discomfort and be at greater risk for dislodgement and/or infection. After the anchor 151 is secured to the periosteum P, the barbed segment 156, the second smooth segment 158, and the needle 160 all remain generally loose/unconfined, such that the needle 160 forms a free end of the suture device 150.

Figure 2H:
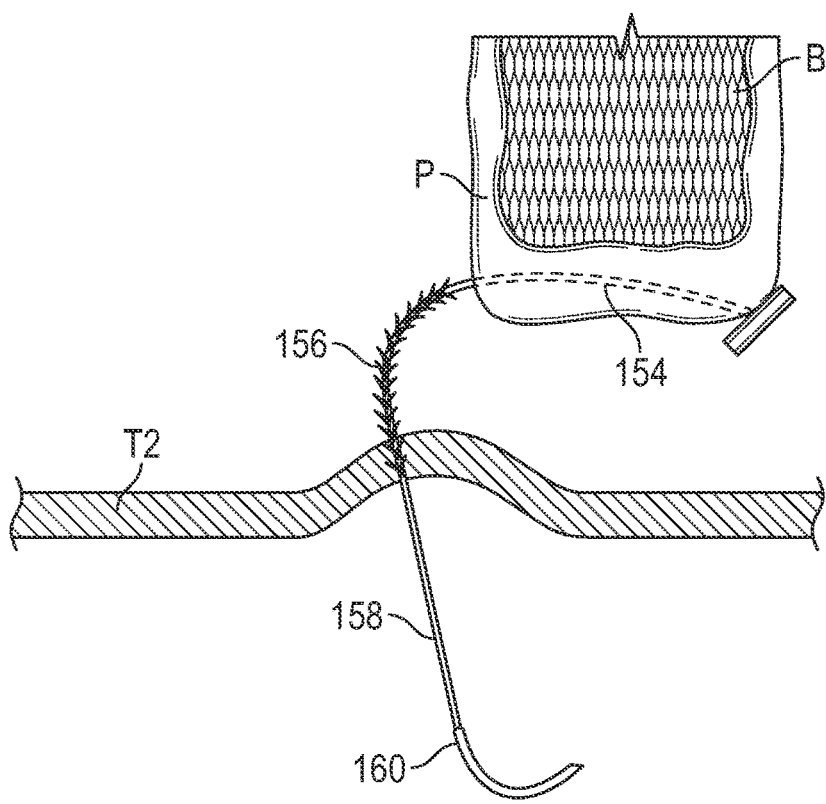

The procedure can continue as shown in FIGS. 2G-2J by securing the free end of the suture to a second target tissue T2 (e.g., the periurethral vaginal wall). For example, the needle 160 can be used to puncture the second target tissue T2, and the second smooth segment 158 and at least a portion of the barbed segment 156 can be pulled (e.g., manually pulled) through the second target tissue. In some embodiments, the second target tissue T2 can also be elevated (e.g., manually elevated) along the barbed segment 156 until a desired urethral support/tension is achieved (e.g., as determined by the physician), as shown in FIG. 2H. The barbs 157 along the barbed segment 156 of the suture device 150 at least temporarily retain the second target tissue T2 in the elevated position.

Figure 2I:
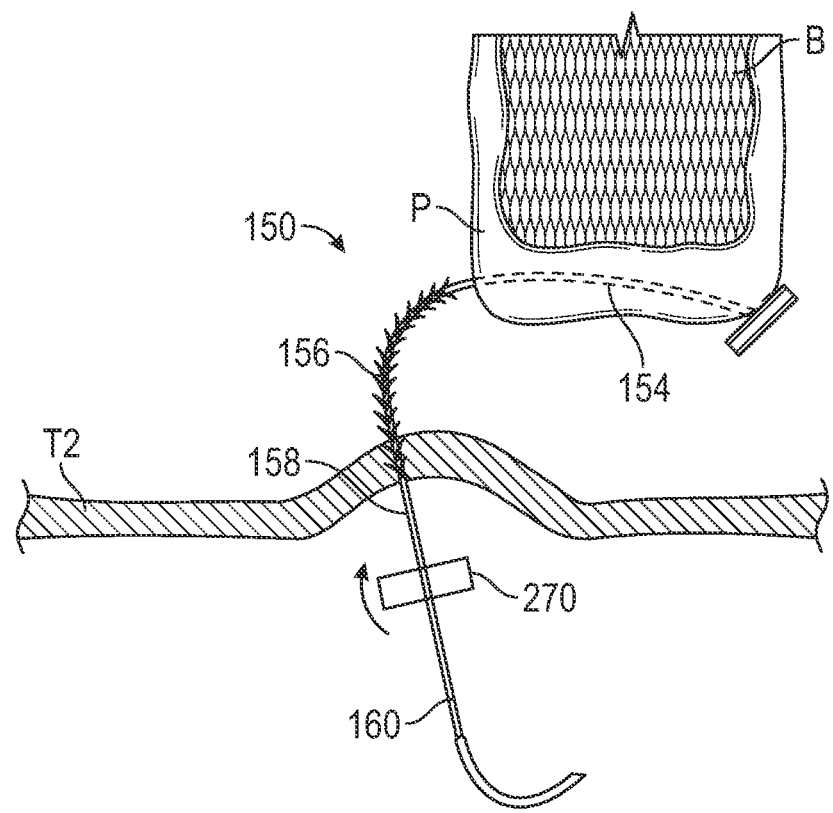

As shown in FIG. 2I, a suture locking element (e.g., a suture clip 270) can then be advanced over the needle 160 and the second smooth segment 158 of the suture device 150 to abut the second target tissue T2. Once the suture clip 270 is at the desired position, the suture clip 270 can be locked to prevent sliding of the suture clip 270 relative to the suture device 150 and to hold the second target tissue T2 in the desired elevated position. Additional features of suture clips are described in greater detail with reference to FIGS. 13A-17.

With the suture clip 270 locked to the suture device 150, the excess portion of the suture device 150 distal to the suture clip 270 (e.g., the needle 160, a portion of the second smooth segment 158, etc.) can then be trimmed and removed from the patient. The application of the suture clip 270 may help secure the tissues until fibrosis occurs.

Figure 2J:
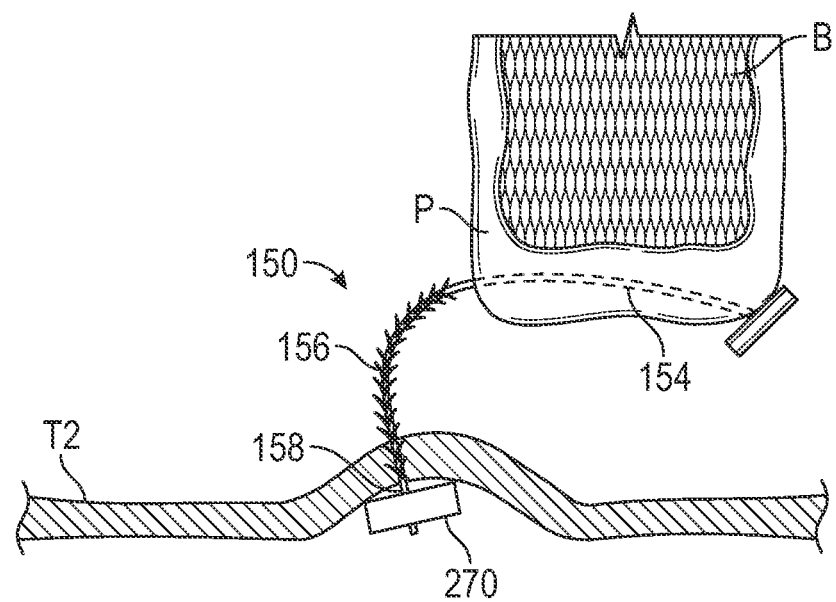

As shown in FIG. 2J, the suture device 150 therefore extends from the periosteum of the first target tissue T1 to the second target tissue T2, therefore providing support to the second target tissue T2 or another adjacent anatomical structure (e.g., the urethra). The procedure illustrated in FIGS. 2A-2I can be repeated any number of times until a desired number of sutures are deployed within the patient to provide adequate support. For example, in some embodiments, a procedure includes bilaterally implanting a total of two, three, four, five, six, seven, eight, or more suture devices 150. In some embodiments, all of the suture devices 150 can be secured to the first target tissue T1 before securing the free end of the suture devices 150 to the second target tissue T2.

Figure 3:
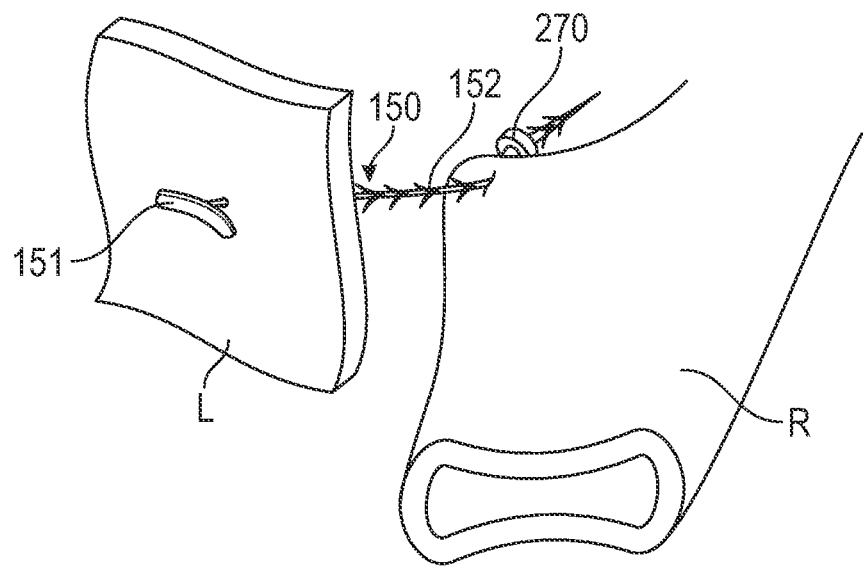
FIG. 3 illustrates the suture device of the tissue-support system of FIG. 1A implanted to provide support to patient tissue in accordance with select embodiments of the present technology.
Figure 4:
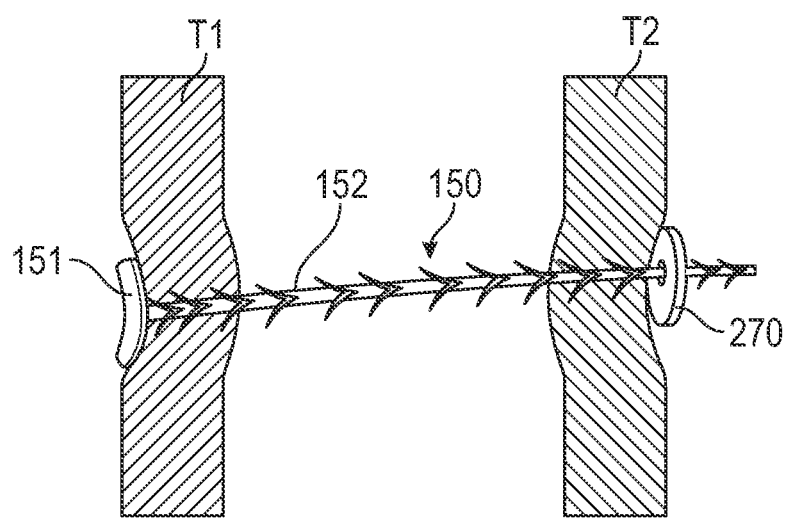
FIG. 4 illustrates the suture device of the tissue-support system of FIG. 1A implanted to provide support to another patient tissue in accordance with select embodiments of the present technology.

Although described above in the context of transvaginal retropubic suspension, the system 100 can be used in other tissue-pexy procedures to provide tissue support. For example, FIG. 3 illustrates use of the suture device 150 in a rectoplexy application in which the suture device 150 is anchored to a sacrospinous ligament L or other suitable anchoring structure and provides support to rectal tissue R. In particular, the anchor 151 is secured to an external surface of the sacrospinous ligament L, and the suture element 152 passes through the sacrospinous ligament L and the rectal tissue R. The suture clip 270 is then advanced over the free end of the suture element 152 to provide support and tension to the rectal tissue R. FIG. 4 illustrates yet another application of the present technology, in which the suture device 150 is deployed to support two adjacent tissue structures T1 and T2.

B. Additional Embodiments of Applicator Devices and Support Sutures

Figure 5:
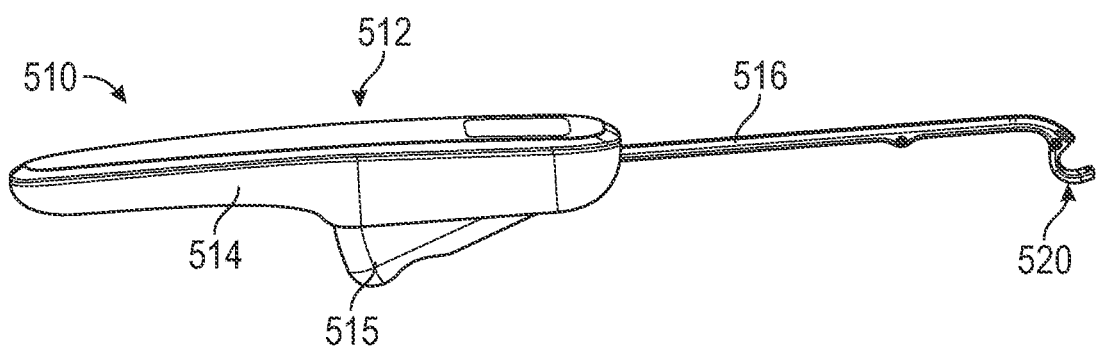
FIG. 5 illustrates another applicator device configured in accordance with select embodiments of the present technology.

FIG. 5 illustrates another applicator device 510 configured in accordance with embodiments of the present technology. The applicator device 510 can be generally similar to the applicator device 110 (FIGS. 1A-1E). For example, the applicator device 510 can include a proximal complex 512, a shaft 516, and a distal complex 520. Relative to the applicator device 110, however, the proximal complex 512 of the applicator device 510 includes a handle 514 and a trigger or actuator 515 positioned generally below the handle 514. The proximal complex 512 is designed such that a user's hand can grip the handle 514, while one or more of the user's fingers on the same hand that is gripping the handle 514 can be used to actuate the trigger 515. That is, the user is expected to be able to grip and actuate the applicator device 510 using a single hand. This is expected to be advantageous because it frees up the user's other hand, which can be used to palpate or adjust tissue, support another portion of the applicator device 510 (e.g., the shaft 516), etc. The applicator device 510 can otherwise be identical to, or generally the same as, the applicator device 110, and therefore can be used as described with respect to FIGS. 1A-4.

Figure 6A:
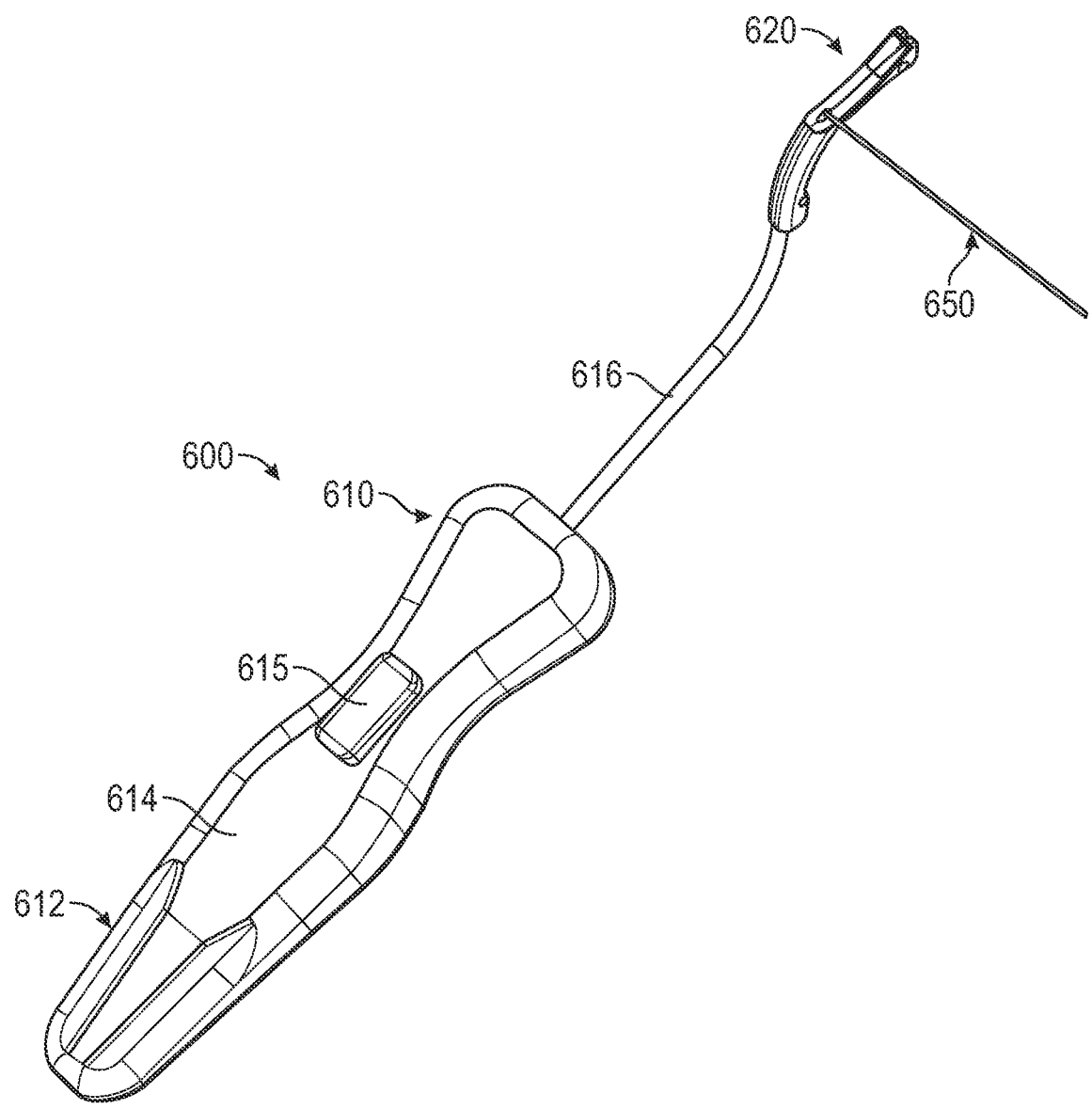
FIGS. 6A-6H illustrate another tissue-support system configured in accordance with select embodiments of the present technology.

FIG. 6A illustrates another tissue-support system 600 ("the system 600") for performing tissue-pexy procedures configured in accordance with select embodiments of the present technology. Similar to the system 100, the system 600 includes an applicator device 610 and a suture device 650 removably carried by the applicator device 610. The applicator device 610 can be generally similar to the applicator devices 110 and 510 described with references to FIGS. 1A-1E and 5, respectively. For example, the applicator device 610 can include a proximal complex 612 having a handle 614 and an actuator or trigger 615 (e.g., shown as a push button), a shaft 616, and a distal complex 620 that carries the suture device 650.

Figure 6B:
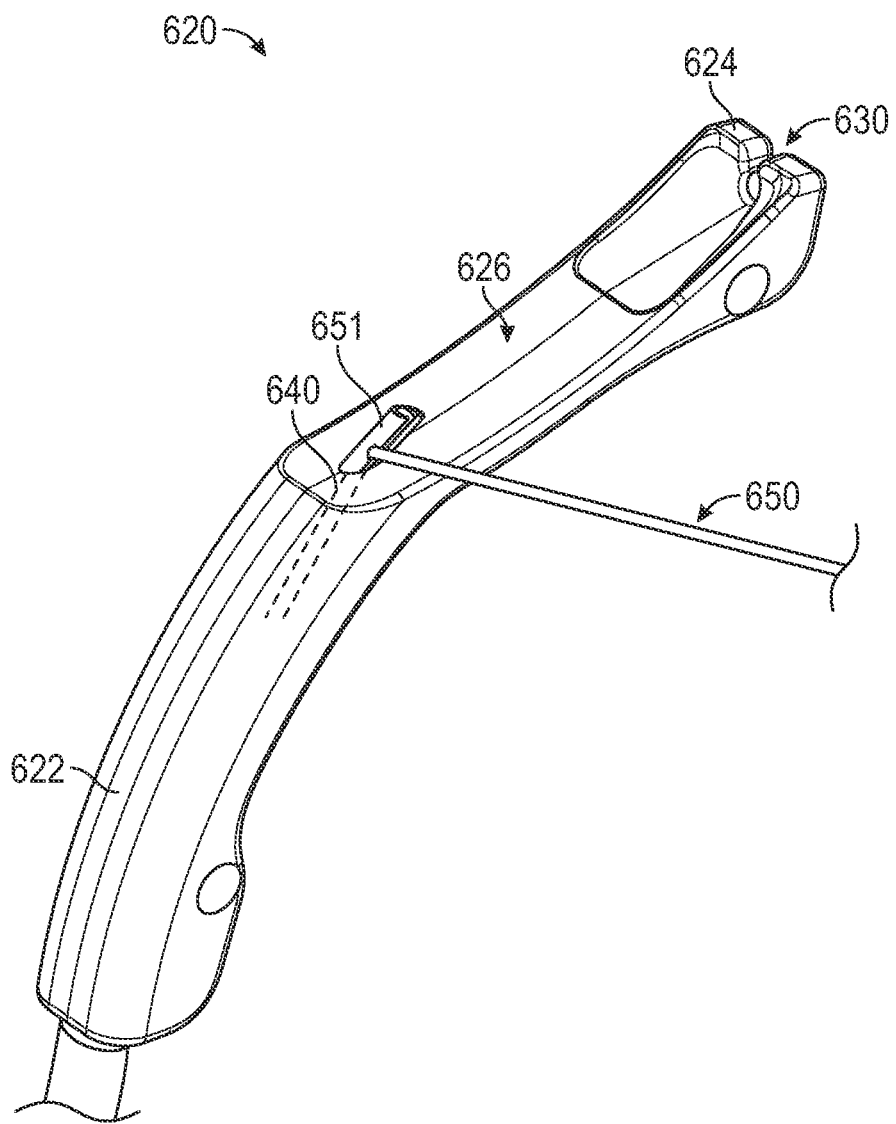
Figure 6C:
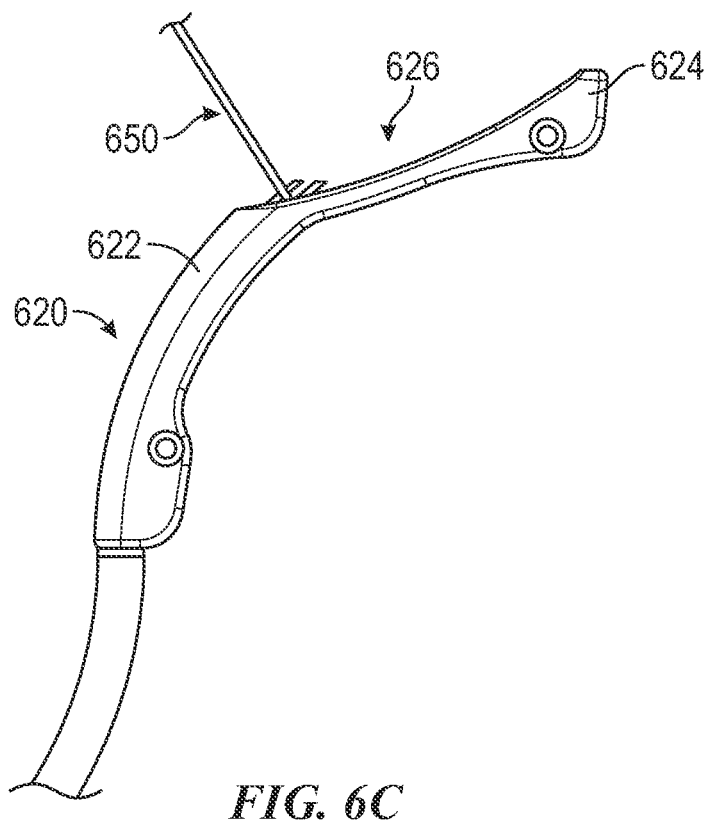
Figure 6D:
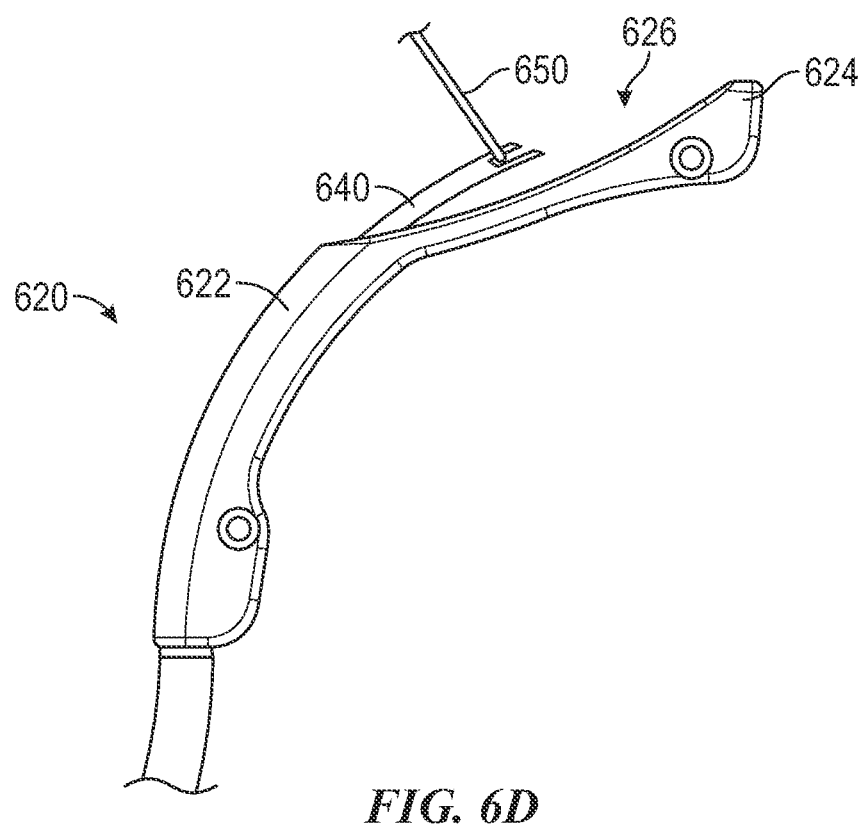
Figure 6E:
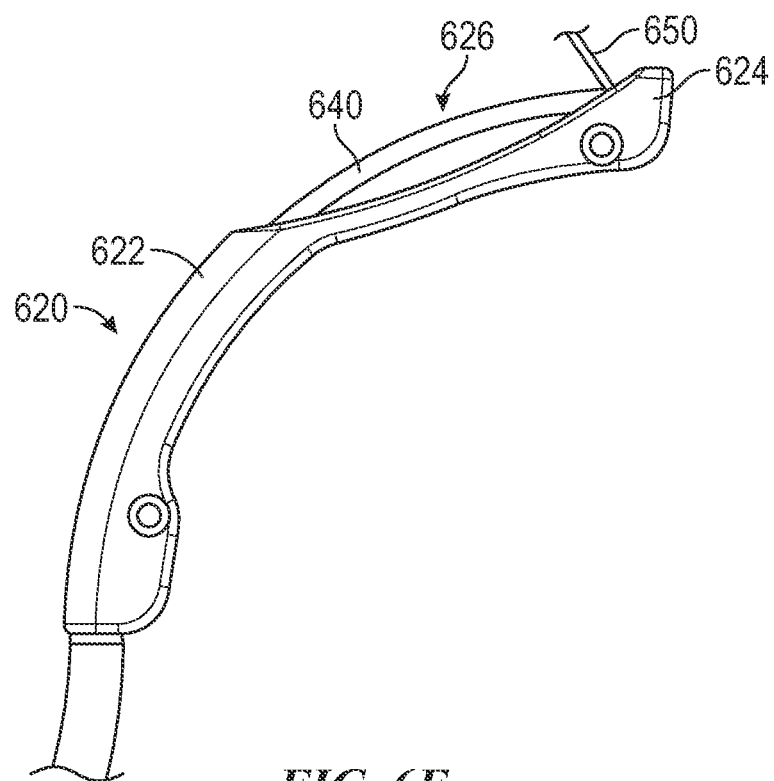
Figure 6F:
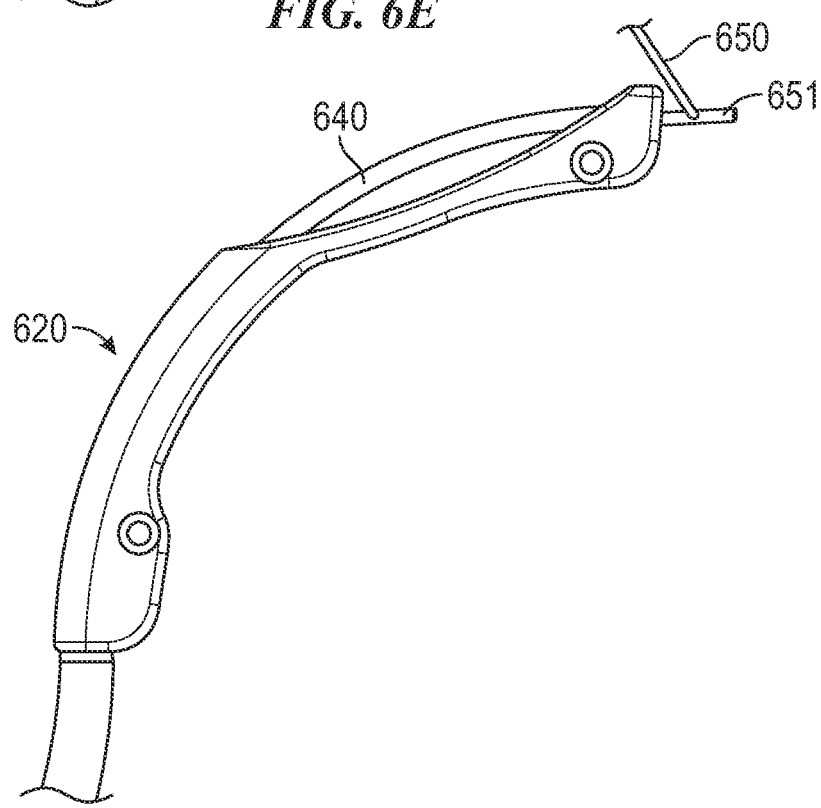
Figure 6G:
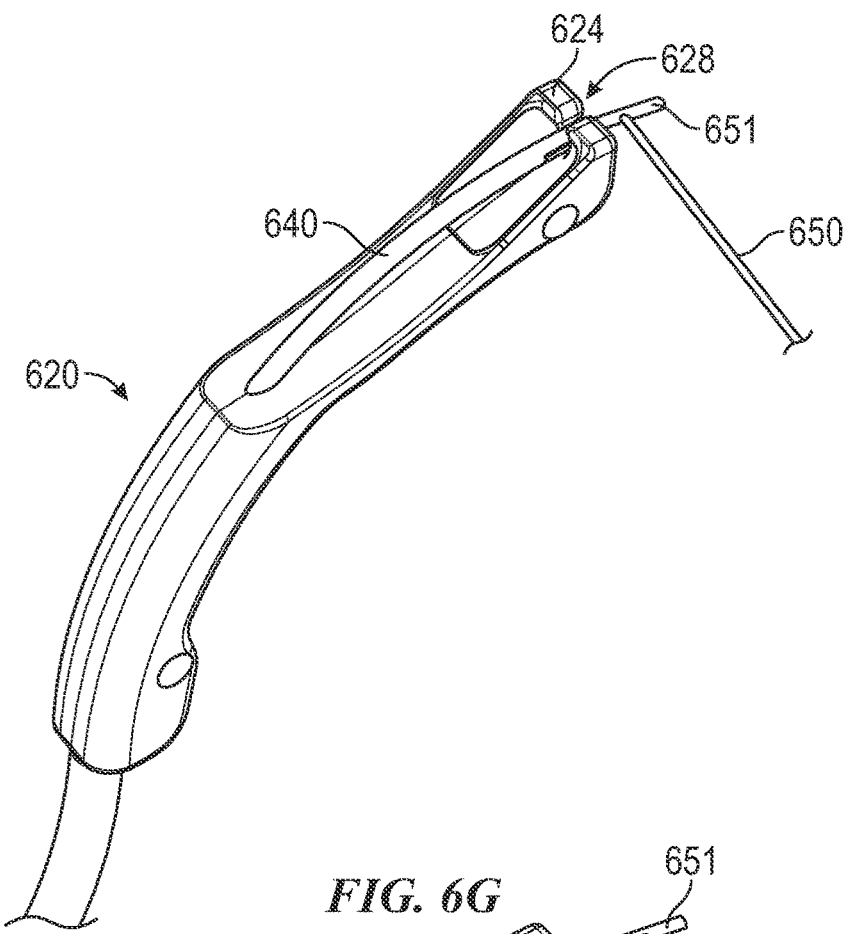
Figure 6H:
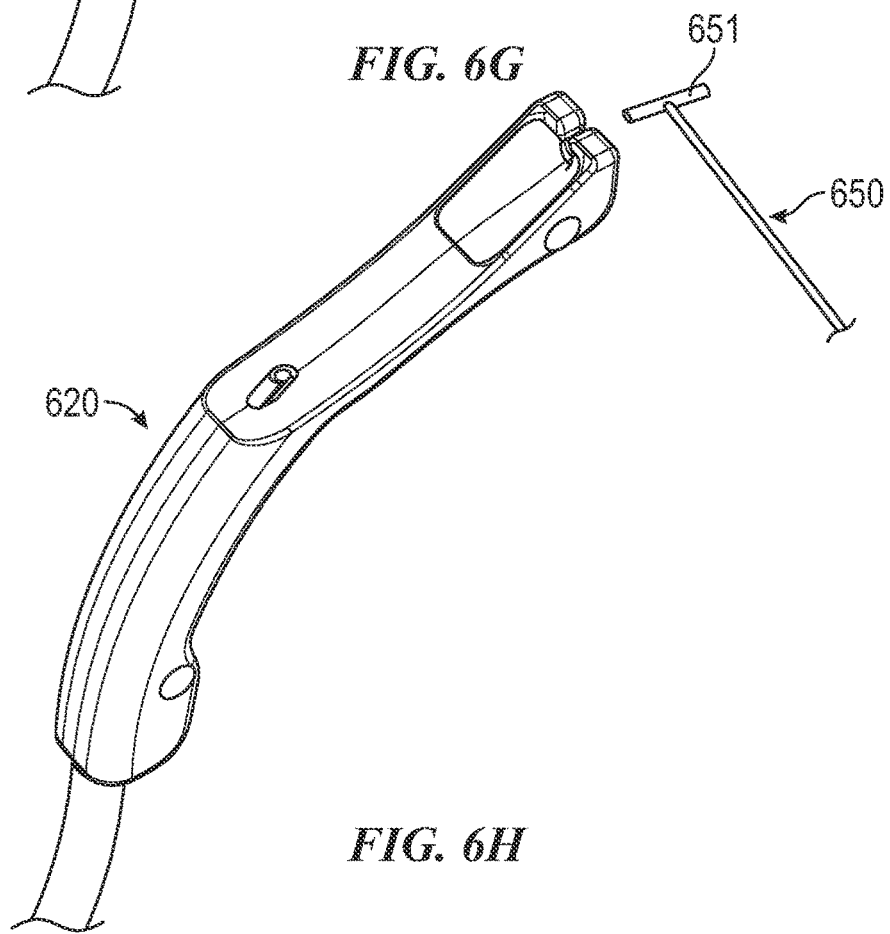

FIG. 6B is an enlarged view of the distal complex 620 of the applicator device 610. As shown, the distal complex can include a proximal portion 622 carrying a needle 640 (shown in broken line in FIG. 6B, best seen in FIGS. 6D-6H), a distal portion 624 having a slot 630 for receiving the tip of the needle 640, and a gap 626 between the proximal portion 622 and the distal portion 624 defining a chamber for receiving tissue and a path for the needle 640 to traverse as it moves from the proximal portion 622 toward the distal portion 624. Similar to the embodiments described previously, an anchor 651 of the suture device 650 can be loaded into the needle 640 contained within the distal complex 620. The anchor 651, and thus the suture device 650, may be deployed by using a push rod (not shown) enclosed within the needle 640. The push rod can be used to advance the anchor 651 with the needle 640 (as seen in FIGS. 6C-6E) across the gap 626 and toward a distal portion 624 of the distal complex 620. As described with respect to FIGS. 2A-2J, the needle 640 and the suture device 650 can be advanced through periosteum or other tissue (not shown). In some embodiments, the push rod or needle may be, without limitation, made of pre-curved steel or nitinol to minimize "straightening" effect as the push rod is advanced distally through the arcuate path of the device. In FIGS. 6F-6H, the anchor 651 is pushed past the distal portion 624 and released. For passage through vaginal/peri-urethral tissue (e.g., for a retropubic suspension procedure), the user may either attach a needle to the free end of the suture device 650, or the needle may be already fixed to the free end of the suture, e.g., as described with respect to the suture device 150 shown in FIG. 1B. The user can then hand-pass the needle with the suture through the peri-urethral tissue. The free suture end may pass through the tissue for peri-urethral fixation.

For peri-urethral fixation, the user may manually tie a knot or may tie a knot using an instrument. Alternatively, a barbed suture can be used to fixate the peri-urethral tissue, as described above. For example, a barbed suture may be used to ratchet a clip into place. As described in detail below with respect to FIGS. 13A-17, the clip may be elastomeric to minimize irritation and facilitate fixation. Alternatively, other fasteners, such as clamp-on clips (e.g., ligation clips) may be used.

Figure 7A:
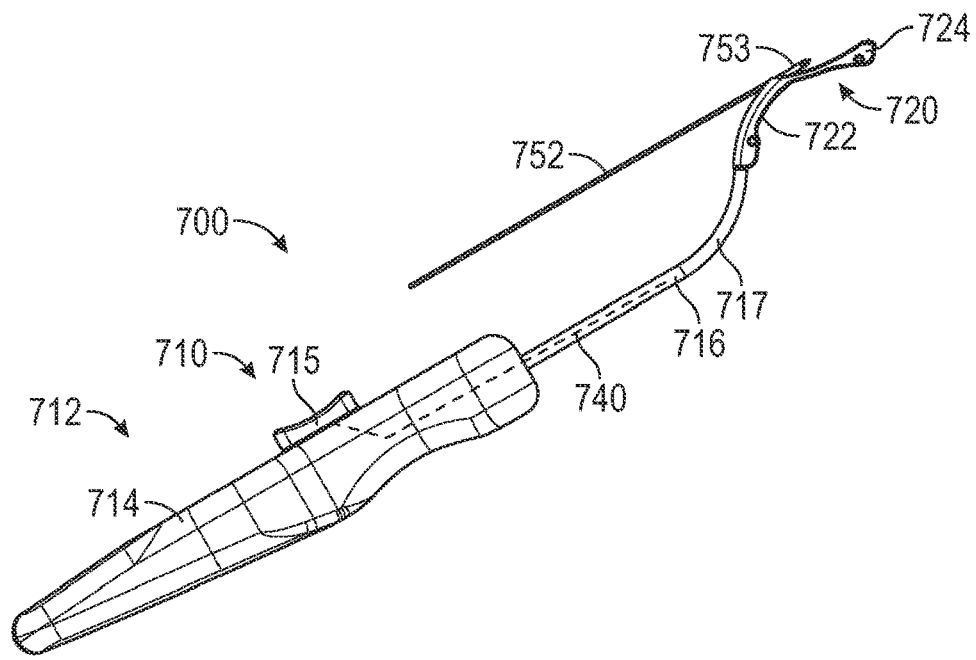

FIG. 7A illustrates another tissue-support system 700 ("the system 700") for performing tissue-pexy procedures and configured in accordance with select embodiments of the present technology. Similar to the system 100, the system 700 includes an applicator device 710. The applicator device 710 may include a handle 714 and a needle guide or shaft 716 coupled to the handle 714. The shaft 716 may be curved, such as but not limited to, a gooseneck shape, S-shape, or other curved shapes, and may or may not have one or more inflection points in the curvature. The illustrated gooseneck shape has the advantage of enabling access to the surgical site while the patient is in a lithotomy position. Moreover, a first point of inflection 717 (and/or a portion of the shaft 716 distal to the first point of inflection 717) defines a shoulder which can rest on an anatomical structure and serve as a fulcrum or rest point (e.g., the bottom of the pubic ramus for positioning during deployment).

Figure 7B:
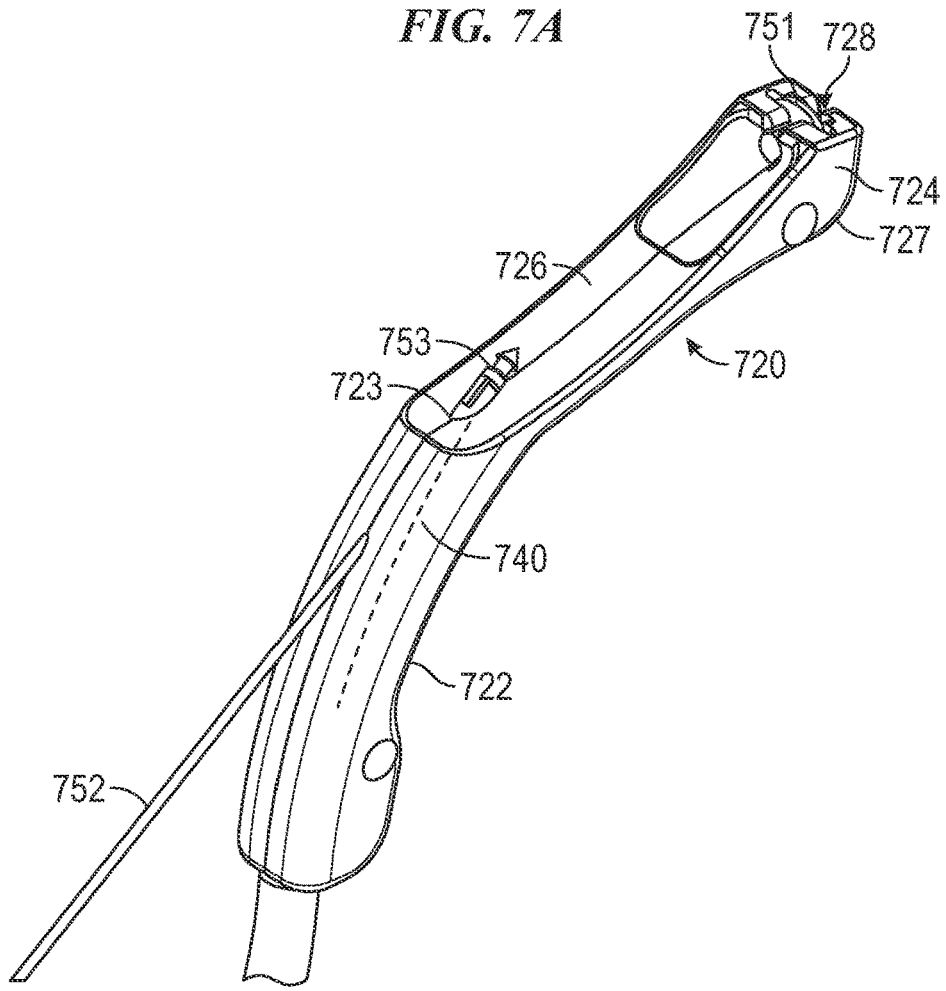

The applicator device 710 may include a distal complex 720 coupled to a distal end of the shaft 716 and defining a suture-anchor coupling member. As best shown in FIG. 7B, the distal complex 720 may include a proximal arcuate portion 722 formed with a lumen 723 through which a needle or sleeve 740 can pass through (shown in broken line). The distal open end of lumen 723 opens to an arcuate trough 726 (e.g., a gap 726) of the distal complex 720. The trough 726 extends distally to a distal portion 724 (e.g., a holding element) of the distal complex 720. The distal portion 724 includes a blunt or rounded lower corner 727 (e.g., not sharp so as not to unnecessarily damage tissue) and a groove or slot 728. Unlike the applicator devices described previously, the distal complex 720 is configured such that the distal portion 724 carries the anchor 751, such that the anchor 751 is decoupled from the suture device 750 until the applicator device 710 is actuated. One potential advantage of this configuration is the anchor 751 does not need to be passed through the target tissue during the deployment procedure.

Referring back to FIG. 7A, a proximal end of the needle 740 may be coupled to a deployment element or actuator 715 (e.g., knob, slider, trigger, lever, etc.) located on the handle 714, similar to the embodiments described previously. The actuator 715 enables holding and actuating the device 710 with one hand and frees the other hand for other actions, such as stabilizing the device or touching anatomical sites. The handle 714 thus provides fine motor skills and reduces the potential of "tenting" or delamination of the periosteum or other target tissue during fixation. The handle 714 may be reusable or disposable.

Figure 8A:
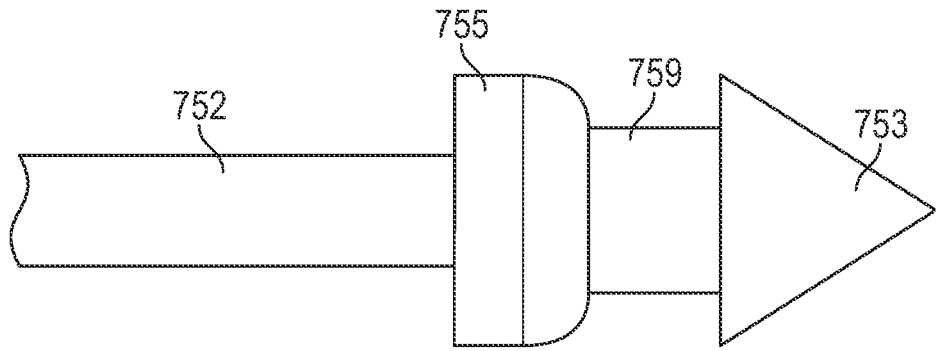
FIGS. 8A-8C illustrate additional features of a suture device of the tissue-support system shown in FIGS. 7A-7H.
Figure 8B:
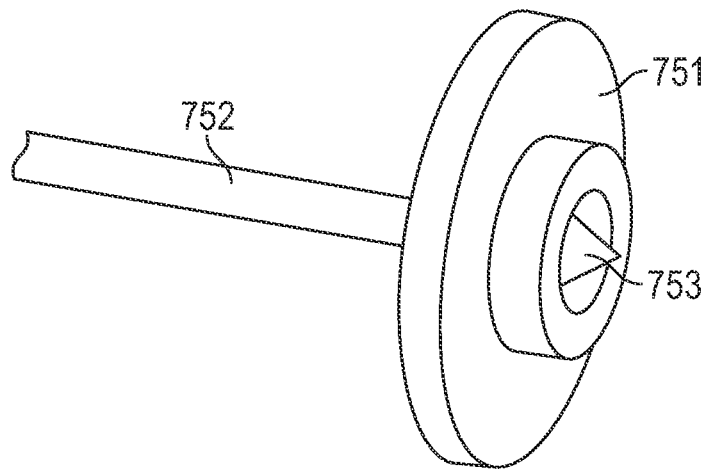
Figure 8C:
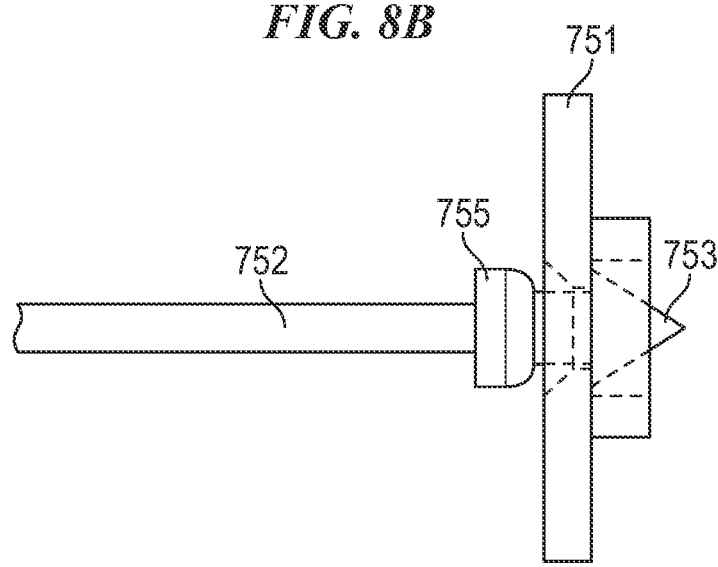

A suture element 752 with a barbed head 753 may be coupled to the distal end of needle 740. Referring to FIGS. 8A-8C, for example, the barbed head 753 may be distally spaced from a proximal stop 755 by a neck portion 759 (FIG. 8A). As will be described below, the applicator device 710 is configured to introduce the barbed head 753 into an aperture (e.g., a suture interface member) of the anchor 751, so that suture element 752 becomes attached to anchor 751 to form a suture device. For example, as seen in FIGS. 8B and 8C, the anchor 751 "snaps" into the neck portion 759 (e.g., by sliding over the barbed head 753) and is secured between stop 755 and barbed head 753. The anchor 751 can have any suitable shaped head (e.g., t-shaped, round, not round, etc.).

Figure 7C:
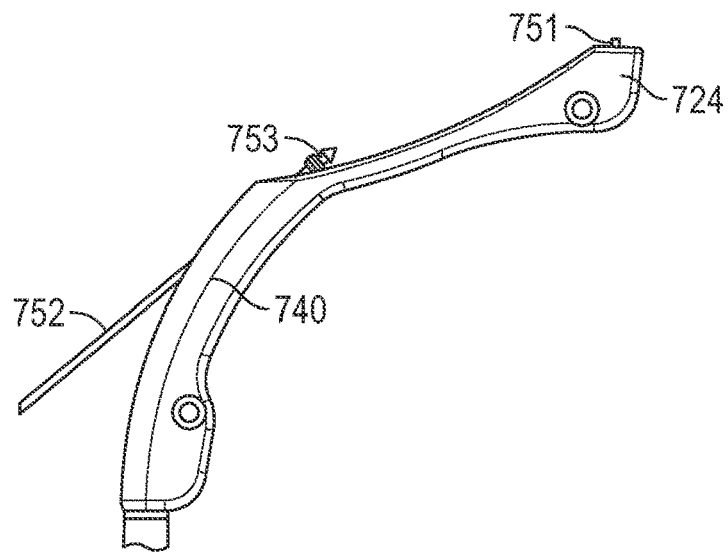
Figure 7D:
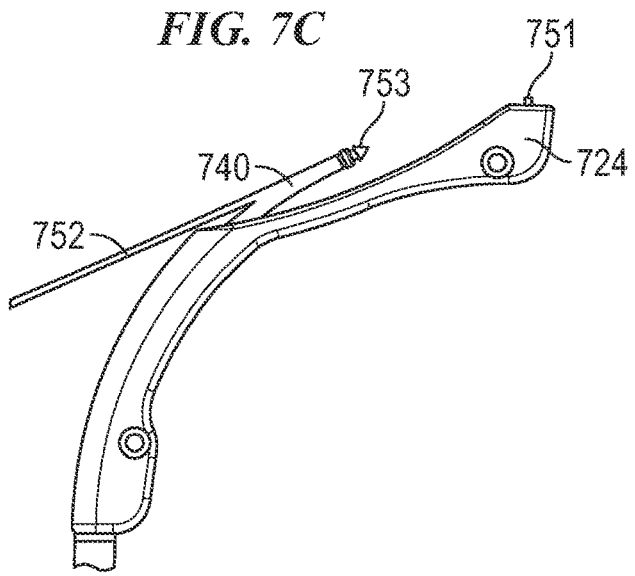
Figure 7E:
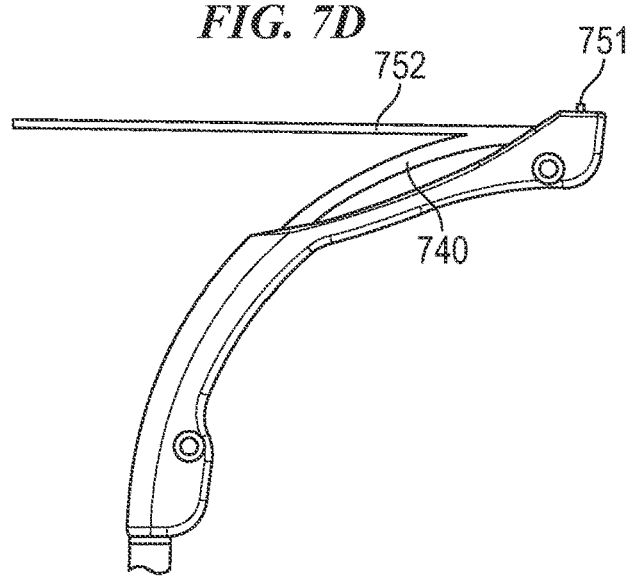

Referring back to FIGS. 7C-7H, various stages of operating the applicator device 710 to couple the suture element 752 to the anchor 751 to form a suture device 750 and deploy the suture device 750 therefrom are illustrated. In FIG. 7C, the suture element 752 with the barbed head 753 is mounted on the needle 740. The anchor 751 is received in the distal portion 724 (e.g., the holding element) of the distal complex 720. In FIG. 7D, the suture element 752 with the barbed head 753 is moved distally toward the distal portion 724 and passes through tissue (not shown). In some embodiments, the barbed head 753 may optionally be the distal portion of the needle 740 instead of the suture element 752, and the suture element 752 can be configured to be coupled to the anchor 751 via another suitable interface. In FIG. 7E, the suture element 752 with the barbed head 753 has been moved completely distally so that the barbed head 753 couples with the anchor 751 (as described above with reference to FIGS. 8A-8C). In FIG. 7F, the needle 740 is pulled proximally, thereby detaching the needle 740 from the barbed head 753, which is now secured to the anchor 751. In FIG. 7G, the needle 740 is pulled more proximally. In FIG. 7H, the formed suture device 750 can be deployed from the applicator device 710, e.g., by releasing the anchor 751. The user can then proceed with the tying procedure (e.g., securing the free end of the suture to the periurethral vaginal wall or other target tissue), as previously described. It is noted that the user can load the suture and anchor manually or with the aid of a jig, or they may be part of a cassette for easy loading into the applicator device 710.

As previously described, the distal portion 724 of the distal complex 720 is positioned against an outer surface of the target tissue (e.g., not under periosteum). This prevents the user from deploying the anchor into the periosteum, which would render it ineffective. In some embodiments, the distal portion 724 may also serve as a safety feature to (a) protect neurovascular structures, and (b) minimize tissue dilation during access to the site.

FIGS. 9A-9D illustrate another technique for using the applicator device 710. In the embodiment shown in FIGS. 9A-9D, the suture element 752 is coupled to a cap 760, which is held within the distal portion 724 of the distal complex 720 (e.g., as opposed to the distal portion 724 holding the anchor 751, as previously described with reference to FIGS. 7A-7H). The needle 740 is coupled to the barbed head 753. As shown in FIG. 9B, the needle 740 can be advanced until the barbed head 753 couples to the cap 760 of the suture element 752. As shown in FIG. 9C, the needle 740 is retracted and pulls the suture device 750 with it through the tissue, such as the periosteum (not shown). As shown in FIG. 9D, the suture device 750 is pulled further proximally (e.g., downward) until the anchor 751 catches on tissue, such as at the top of the tunnel in the periosteum. The user then pulls the applicator device 710 out of the body and pulls the suture device 750 until the anchor 751 at the opposite end engages with the periosteum. In some embodiments, the user can replace the cap 760 in the distal portion 724, and the procedure can be repeated to place the suture element 752 through a second a patient tissue (e.g., the peri-urethral tissue). In some embodiments, the applicator device 710 may utilize a loop for grabbing instead of the cap 760.

Each of the foregoing embodiments include passing a suture element through the periosteum (or other anchoring tissue), and having an anchor external to the periosteum (or other anchoring tissue). This is expected to provide several advantages. For example, by not placing the anchor or anchor hooks into the periosteum, the portion of the suture device that must be placed inside the periosteum or bone is minimal (e.g., only a small segment of the suture element is "inside" the periosteum, and nothing is "inside" or protruding into the bone). This is expected to reduce patient discomfort and potential side effects relative to conventional methods of anchoring previous retropubic suspension devices. Moreover, the above-described techniques are expected to provide more secure anchoring than conventional anchors that do not have a suture element passing through the periosteum coupled to an anchor positioned external to the periosteum.

In some embodiments, however, the present technology includes suture devices that are anchored into the periosteum using one or more anchor hooks. For example, FIGS. 10A-11D illustrate a tissue-support system 1000 ("the system 1000") for performing tissue-pexy procedures by placing suture devices with anchoring hooks into the periosteum (or other target tissue), and configured in accordance with select embodiments of the present technology. The system 1000 includes an applicator device 1010 (best seen in FIG. 10A) and a suture device 1050 (best seen in FIGS. 10B-10D). The applicator device 1010 can include a curved needle 1016 coupled to a manipulator 1017 (shown in broken line in FIG. 10A). Although illustrated as curved, in some embodiments the needle 1016 is straight or substantially straight. In some embodiments, the needle 1016 can have an outside diameter of between 2 mm and 5 mm, such as 3.5 mm, although dimensions outside the foregoing ranges are possible and within the scope of the present technology. A proximal end of the manipulator 1017 may be coupled to a deployment element (e.g., knob) 1015 located on a handle 1014 of the applicator device 1010.

Figure 10A:
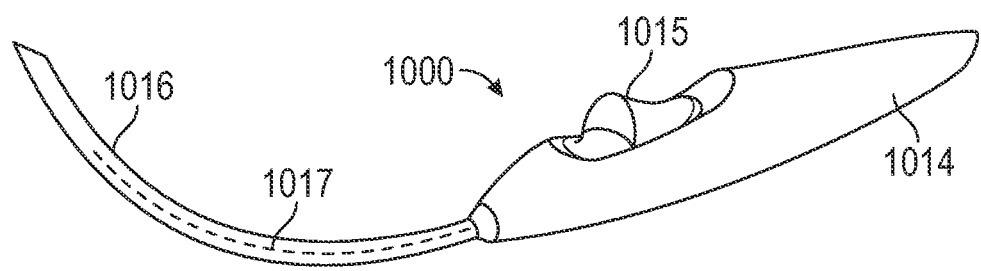
FIGS. 10A-10D illustrate a tissue-support structure having a suture device with a periosteal anchoring element and configured in accordance with select embodiments of the present technology.
Figure 10B:
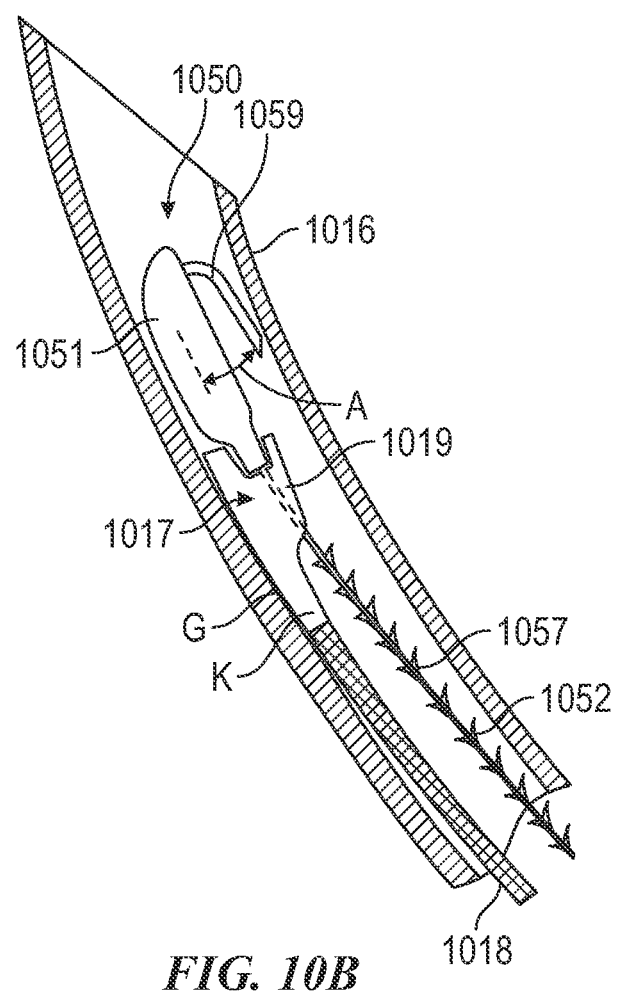

As shown in FIG. 10B, the manipulator 1017 may include a slender member 1018 (such as a wire) and a suture interface member 1019 located at a distal end of the slender member 1018. The suture interface member 1019 may have an anti-rotation structure, such as a key K that slides in a groove G formed on an inner surface of the needle 1016, or by having a shape that slides and does not turn on the inner periphery of the needle 1016, such as a rectangular or polygonal shape. The anti-rotation structure prevents or least reduces the suture interface member 1019 from rotating inside the needle 1016.

The base 1051 may be held by the suture interface member 1019, such as by a male-female coupling. For example, in the non-limiting illustrated embodiment, the base 1051 may have a protrusion that is received in a slot in the suture interface member 1019. A suture element 1052 is coupled to the base 1051 and may include superior-facing barbs 1057. The barbs 1057 are also referred to as reverse orientation barbs; the barbs point superiorly, that is, they point upwards when the patient is standing. A non-limiting example of a suitable barbed suture element is the ETHICON STRATAFIX suture. The suture element 1052 may be coupled to the base 1051 by crimping, or by passing a portion of the suture element 1052 through a hole in the base 1051 and then joining the end of the suture element 1052 that passed through the hole to the rest of the suture element 1052, such as by crimping, tying, sonic welding, bonding or any other joining method.

The suture device 1050 may include one or more periosteal anchoring elements 1059, such as one or more hooks or barbs that extend from the base 1051. The periosteal anchoring element 1059 may be angled outwardly from the base 1051 by an angle A, which may be between about 10-30°, such as about 20°, although values outside the foregoing range are possible within the scope of the present technology. In some embodiments, instead of a hook, the periosteal anchoring element 1059 may include an eyelet. The suture element 1052 can be coupled to or into the eyelet either directly or with an additional loop or portion of suture designed to secure onto the anchoring element 1059. This allows the surgeon to use one consistent anchoring element with the flexibility to attach different kinds of implants (sutures or straps) of various sizes, stiffness, etc.

Figure 10C:
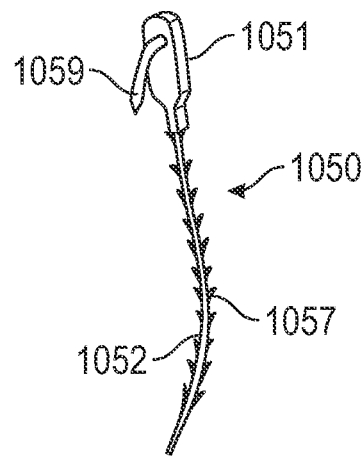
Figure 10D:
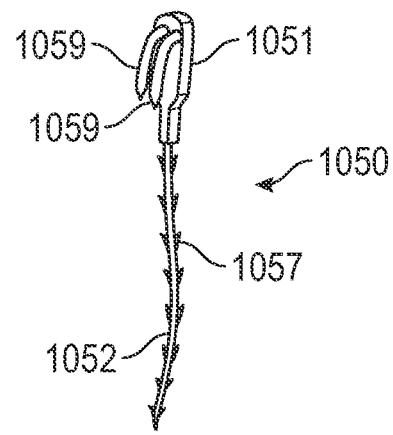

FIG. 10C illustrates the suture device 1050 with the base 1051 having a single periosteal anchoring element 1059. FIG. 10D illustrates the suture device 1050 with the base 1051 having more than one periosteal anchoring element 1059 (i.e., two elements 1059). In other embodiments, the base 1051 may have more than two periosteal anchoring elements 1059, such as three, four, five, or more.

Figure 11A:
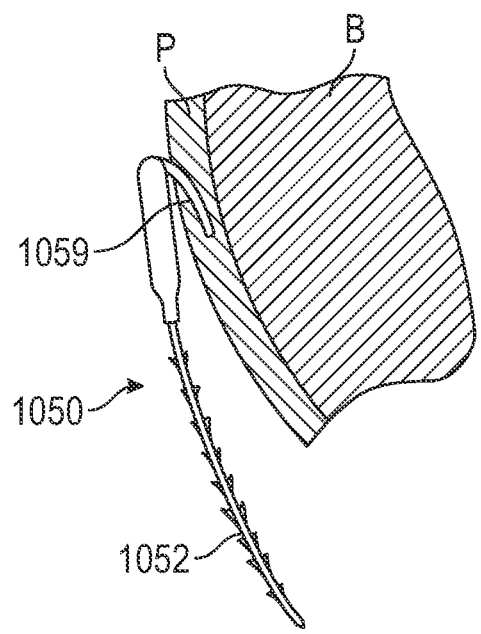
FIGS. 11A and 11B illustrate the suture device of FIGS. 10A-10D anchored to the periosteum in accordance with select embodiments of the present technology.
Figure 11B:
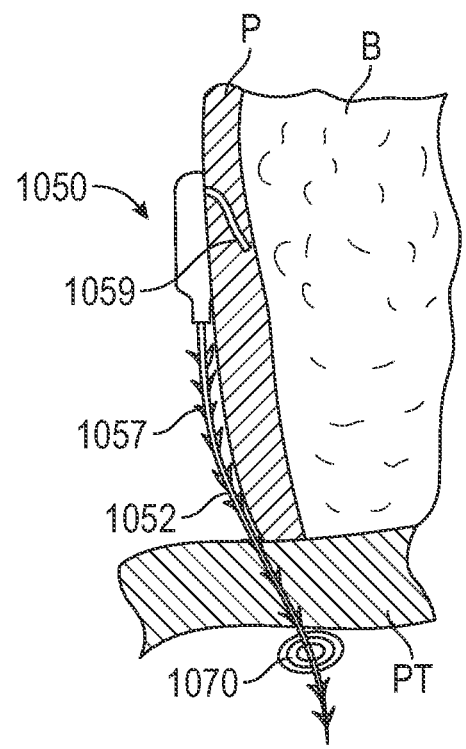

FIG. 11A illustrates the periosteal anchoring element 1059 anchored into the periosteum P covering bone B, such as the pelvic bone. FIG. 11B illustrates the suture device 1050 in a pelvic floor repair application, such as for treating stress urinary incontinence, with one end of the suture device 1050 anchored into the periosteum P with the periosteal anchoring element 1059, and the other end coupled to periurethral tissue PT with a suture locking element 1070 (e.g., a suture clip). Without limitation, the anchoring element 1059 may be placed into the periosteum along any portion of the pubic bone including pubic rami and/or midline. Examples of suture locking elements 1070 are described below with reference to FIGS. 13A-17.

In operation, and referring generally to FIGS. 10A-12B, the suture device 1050 can be loaded onto the manipulator 1017 by pushing the manipulator 1017 distally out of the curved needle 1016 of the applicator device 1010 (e.g., by pushing the deployment element 1015), so that the user can insert the suture device 1050 and mount the base 1051 on the suture interface member 1019. The suture element 1052 lies freely inside the curved needle 1016. After mounting on the manipulator 1017, the suture device 1050 and the manipulator 1017 are moved proximally back into the curved needle 1016 to the position shown in FIG. 10B.

The user then pierces tissue with the curved needle 1016 to introduce the curved needle tip towards the desired suturing site for the suture device 1050. The manipulator 1017 is moved distally to deploy the periosteal anchoring element 1059 out of the distal end of the curved needle 1016. The user hooks or otherwise attaches the periosteal anchoring element 1059 to the target tissue such as periosteum. In some embodiments, a periosteal debridement plate, having a roughened texture, may be used to clean or prepare the periosteal surface prior to anchor deployment. The anchoring of the periosteal anchoring element 1059 into the periosteum may be felt by the user. The manipulator 1017 may then be retracted back into curved needle 1016. This exposes the barbs 1057 along the length of suture element 1052.

Figure 12:
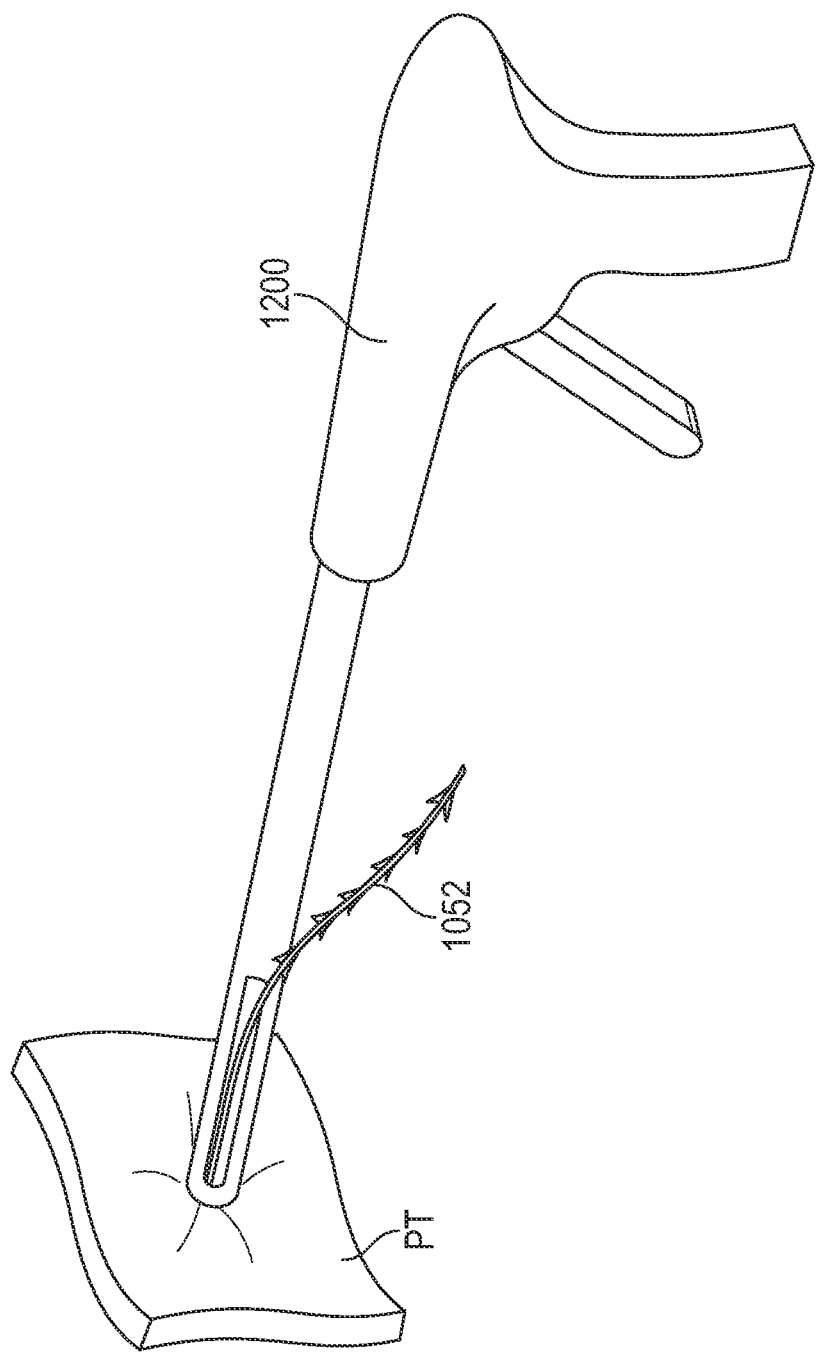
FIG. 12 illustrates a suture lock applicator device configured in accordance with select embodiments of the present technology.

A proximal segment of the suture element 1052 may be grasped by the user or by means of a suture lock applicator 1200, shown in FIG. 12. The user presses the barbs 1057 into the prolapsed tissue and then introduces the proximal end of the suture element 1052 through periurethral tissue PT (as shown in FIGS. 11B and 12) or rectal tissue (as shown in FIG. 3) or any other tissue. The user then uses the suture lock applicator 1200 to apply suture locking element 1070 to the proximal segment of the suture element 1052, and cuts off any excess suture. An example of a suture lock applicator 1200 is the LIGAMEX endoscopic clip applicator commercially available from Ethicon of Raritan, New Jersey. The application of suture locking element 1070 may help secure the tissues until fibrosis occurs. As a result, and as previously described herein, the taut suture element 1052 is fixed at its two ends to two tissues (in this example, the periosteum and the periurethral tissue) and its barbed length presses against and supports the prolapsed tissue. The procedure is repeated for any number of suture elements 1052 as the application requires.

C. Select Embodiments of Suture Locking Elements

Figure 13A:
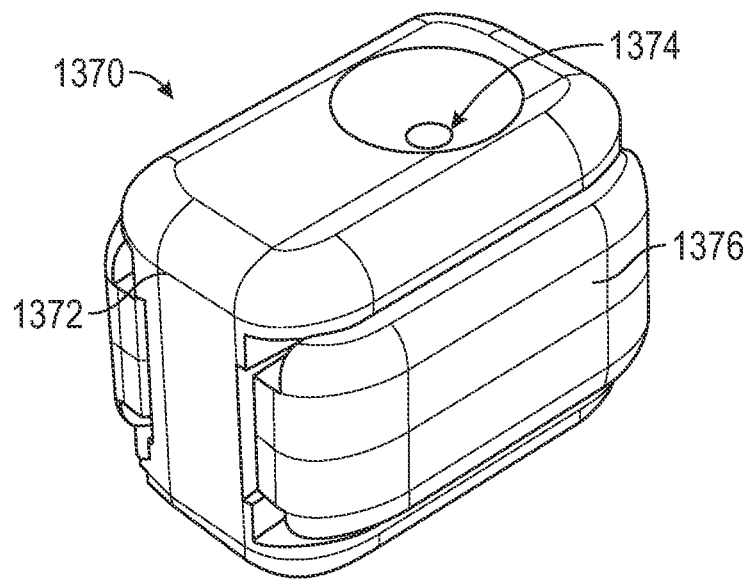
FIGS. 13A-17 illustrate various embodiments of suture locking elements configured in accordance with select embodiments of the present technology.
Figure 13B:
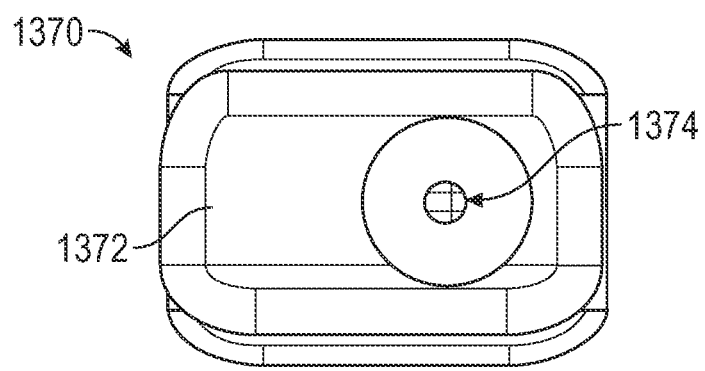
Figure 13C:
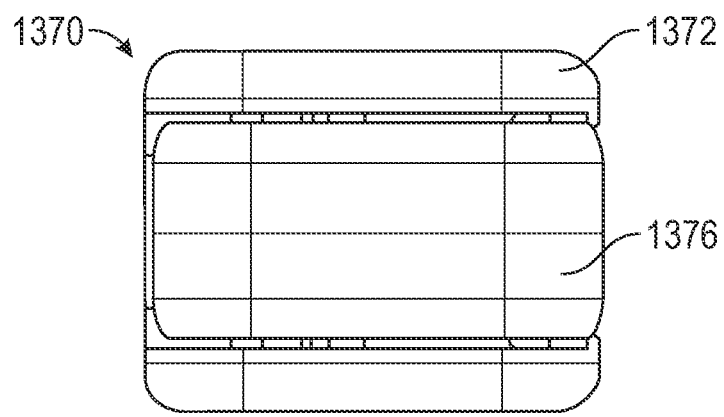

The present technology further includes suture locking elements configured to be advanced over a suture element and secured thereto. FIGS. 13A-13C, for example, illustrate a suture locking element 1370 (e.g., a suture clip 1370) configured in accordance with select embodiments of the present technology. In particular, FIG. 13A is an isometric view of the suture locking element 1370, FIG. 13B is a top view of the suture locking element 1370, and FIG. 13C is a side view of the suture locking element 1470. Referring collectively to FIGS. 13A-13C, the suture locking element 13D includes a housing 1372 having a channel (not shown) extending therefore through between a first aperture or port 1374 positioned on a first side of the housing 1372 and a second aperture or port (not shown) positioned on a second side of the housing 1372. The channel is configured to receive a portion of a suture element (not shown) such that the suture element extends through the channel between the first aperture 1374 and the second aperture. In some embodiments, the channel has a tortuous path.

The suture locking element 1374 further includes closure elements 1376, which in the illustrated embodiment are positioned on respective sides of the housing 1372. The closure elements 1376 can be pressed by a user to change the tension on a portion of suture element positioned within the channel. For example, the closure elements 1376 can be toggled between three states: a first state in which the channel is fully open/unlocked (e.g., to permit loading of the suture element), a second state in which the channel is partially closed/locked (e.g., to prevent the suture locking element 1370 from unintentional slipping on the suture element during placement), and a third state in which the channel is fully locked (e.g., to prevent movement of the suture locking element 1370 relative to the suture element).

Figure 14A:
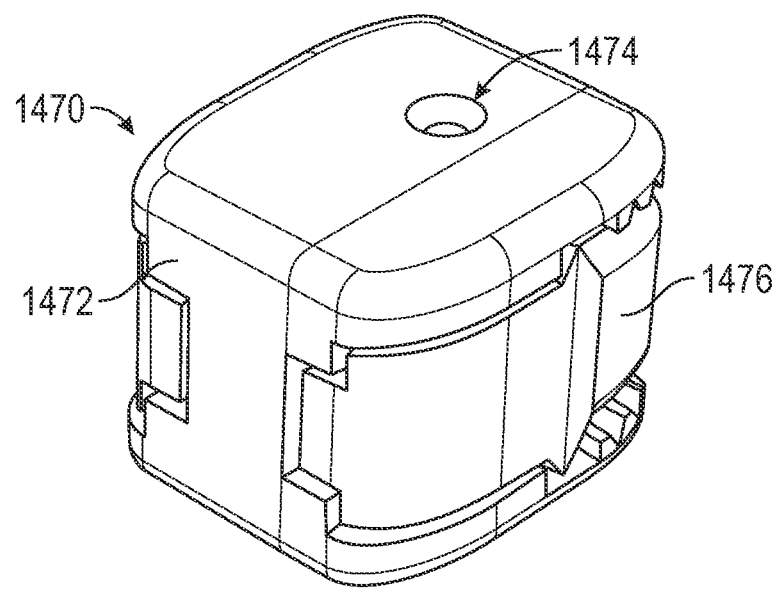
Figure 14B:
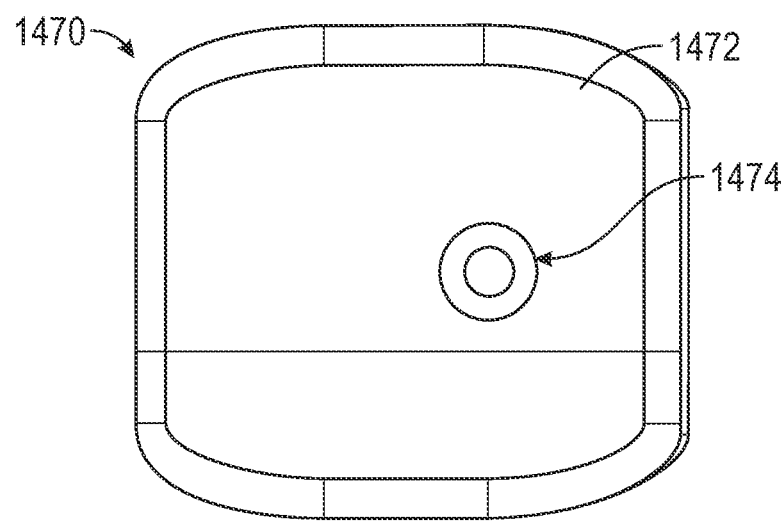
Figure 14C:
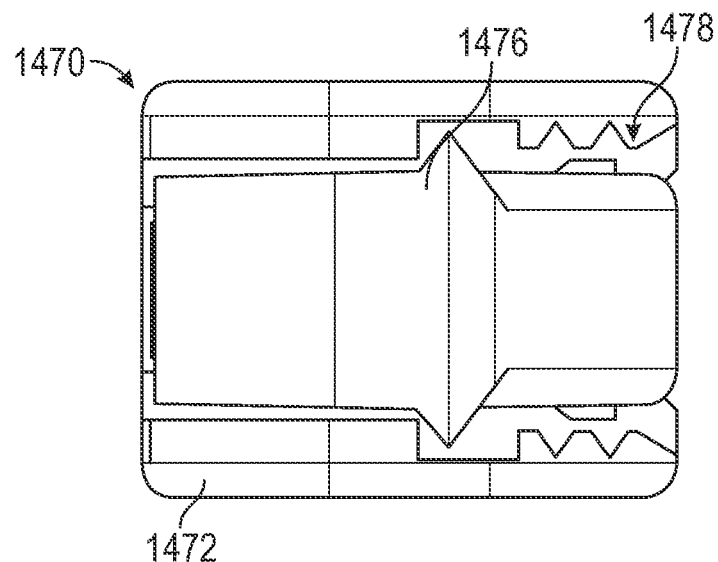

FIGS. 14A-14C illustrate another suture locking element 1470 (e.g., a suture clip 1470) configured in accordance with select embodiments of the present technology. In particular, FIG. 14A is an isometric view of the suture locking element 1470, FIG. 14B is a top view of the suture locking element 1470, and FIG. 14C is a side view of the suture locking element 1470. Referring collectively to FIGS. 14A-14C, the suture locking element 1470 can be similar to the suture locking element 1370 (FIGS. 13A-13C), including a housing 1372 and a channel (not shown) extending between a first aperture 1374 and a second aperture (not shown). However, relative to the suture locking element 1370, the suture locking element 1470 include slidable closure elements 1376 that can be slidable moved by a user (e.g., along sawtooth ratchet 1378, best shown in FIG. 14C) to transition the suture locking element 1470 between the three states.

Figure 15:
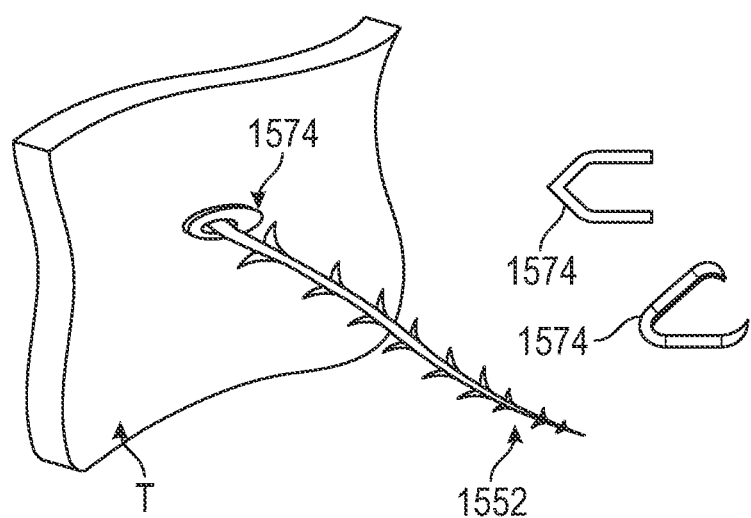
Figure 16:
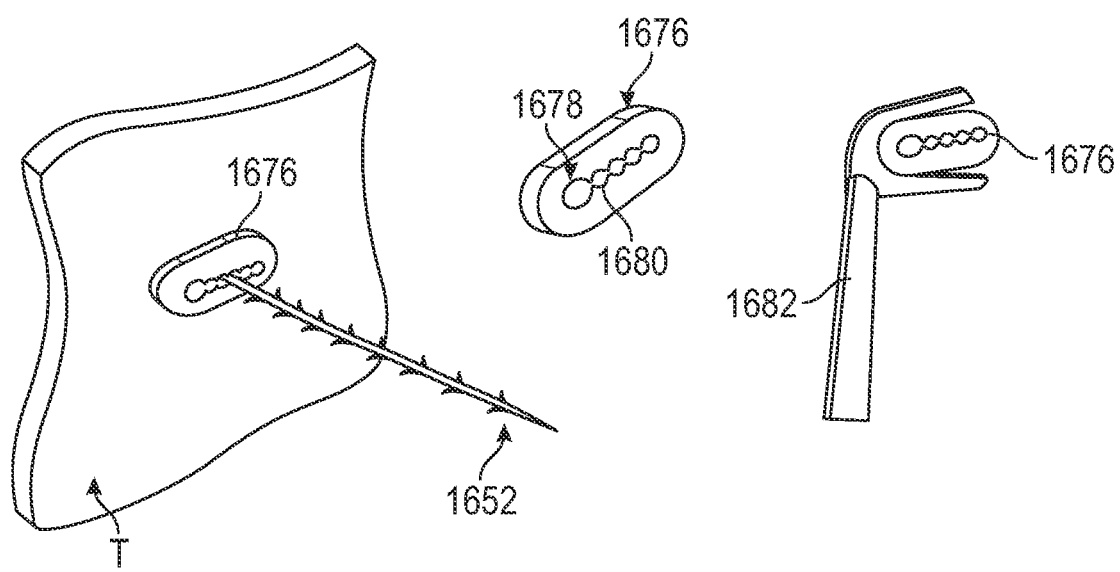
Figure 17:
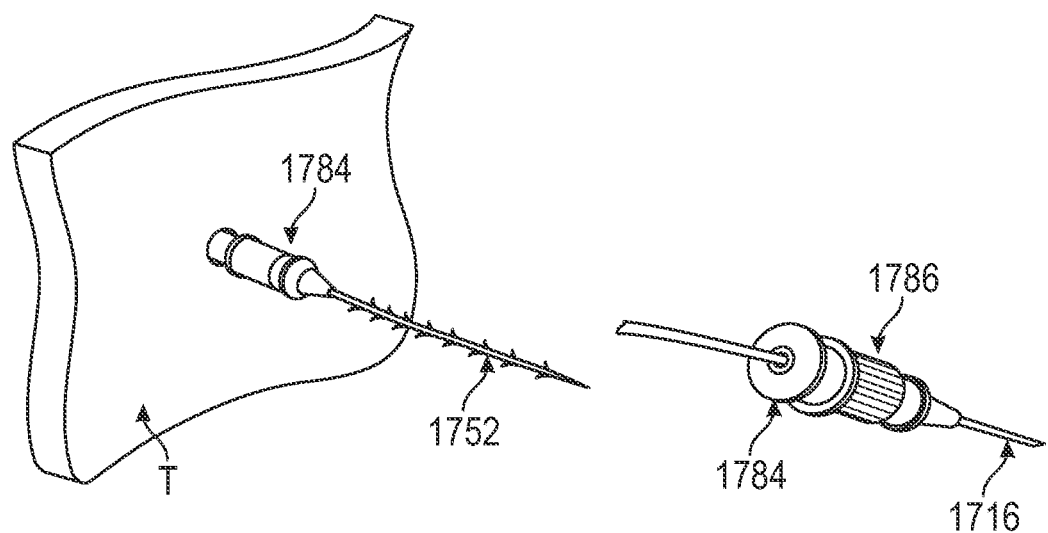

FIGS. 15-17 illustrate additional embodiments of suture locking elements configured in accordance with embodiments of the present technology. FIG. 15 illustrates use of ligation clips 1474 to lock onto a suture element 1552. FIG. 15 illustrates use of gripping lock clips 1576, which may be formed with an aperture 1578 in line with a series of gripping teeth 1580. A grip applicator 1582 may be used to grasp and apply the gripping lock clips 1576 over a suture element 1652. FIG. 16 illustrates use of collet locks 1684, which may be locked in place over a suture element 1752 using a sliding lock member 1686.

The suture locking elements described herein can be made of any suitable biocompatible material(s). For example, in some embodiments, the suture locking elements are made of an at least partially resorbable material, such as Polydioxanone or the like. In other embodiments, the suture locking elements are composed of non-resorbable biocompatible materials, such as stainless steel, nitinol, etc.

D. Select Methods of Performing

Figure 18:
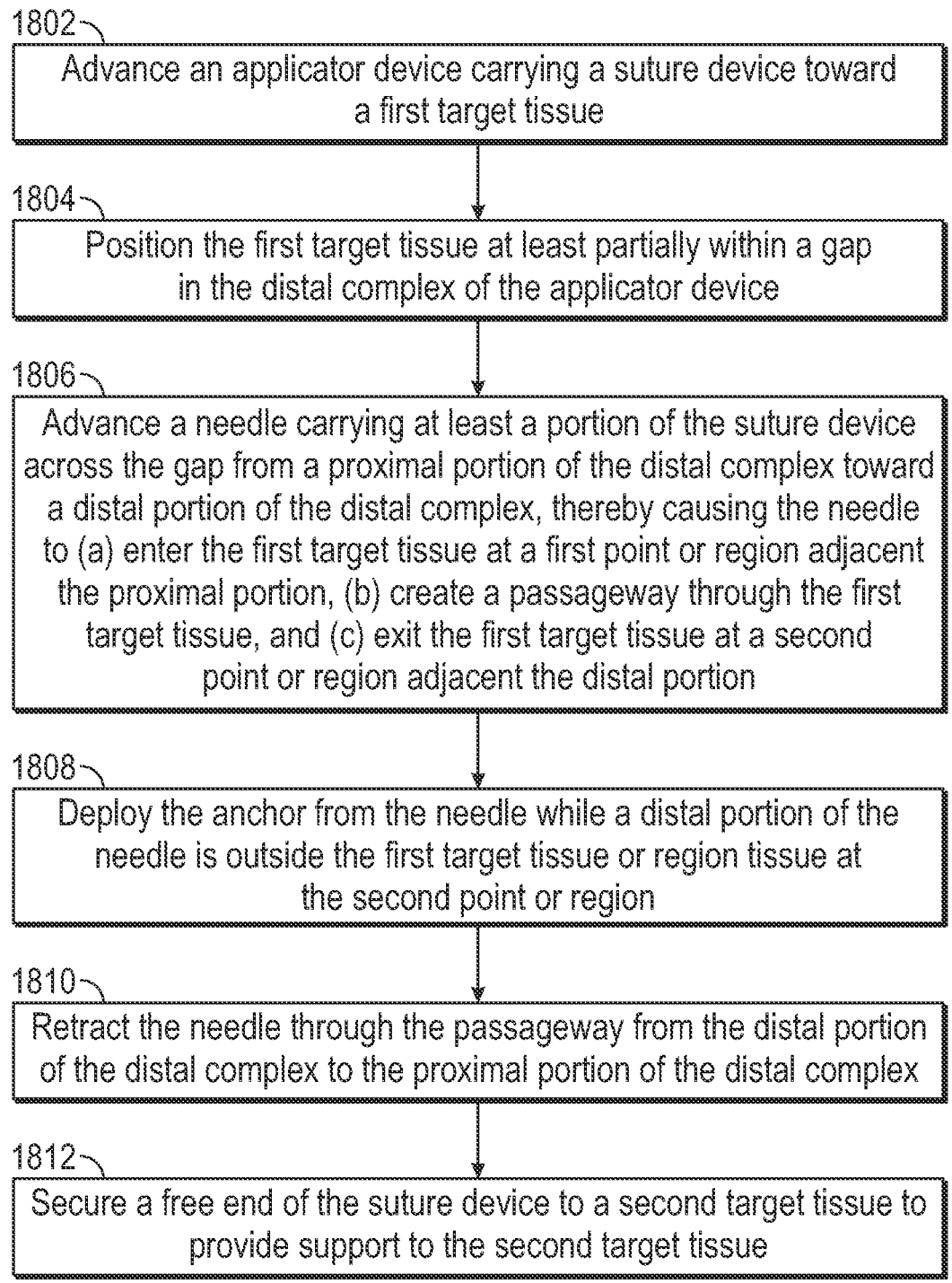
FIG. 18 is a flowchart of a method for performing a tissue-pexy procedure in accordance with select embodiments of the present technology.

As provided above, the present technology includes methods for performing tissue-pexy procedures, such as by anchoring a suture device into a first target tissue and a second target tissue. FIG. 18 illustrates an example method 1800 for performing a tissue-pexy procedure in accordance with select embodiments of the present technology. The method 1800 can begin in operation 1802 by advancing an applicator device carrying a suture device toward a first target tissue. The applicator device and suture device can be the same as, or generally similar to, any of the applicator devices and suture devices described herein. In some embodiments, the suture device must be loaded into the applicator device (e.g., by placing an anchor of the suture device into a hollow needle of the applicator device) by a user (e.g., physician) prior to advancing the applicator device. In other embodiments, the suture device may be pre-loaded on the applicator device.

Depending on the procedure being performed, a user may also need to prepare tissue before advancing the applicator device in operation 1802. For example, for a transvaginal retropubic suspension procedure, a user may need to perform a suburethral vaginal incision and dissect toward the retropubic space to provide access for the applicator device to reach the target tissue. The applicator device can subsequently be advanced through the suburethral vaginal incision and into the retropubic space. The applicator device can continue to be advanced until a distal complex of the applicator device contacts the first target tissue, which in the case of transvaginal retropubic suspension may be an inferior aspect of the pubic bone.

The method 1800 can continue in operation 1804 by positioning the first target tissue at least partially within a gap in the distal complex of the applicator device. Positioning the first target tissue in the gap (e.g., a concave portion of the distal complex/head) may advantageously limit the depth of insertion of the first target tissue. For a retropubic suspension procedure in which the first target tissue is an inferior aspect of the pubic bone, operation 1804 may include positioning a portion of the pubic bone into the gap.

The method 1800 can continue in operation 1806 by advancing a needle carrying at least a portion of the suture device across the gap from a proximal portion of the distal complex toward a distal portion of the distal complex. This causes the needle to (a) enter the first target tissue at a first point or region adjacent the proximal portion, (b) create a passageway through the first target tissue, and (c) exit the first target tissue at a second point or region adjacent the distal portion. Moreover, because the needle carries the suture device, advancing the needle also advances at least a portion of the suture element from the first point to the second point through the passageway. Advancing the needle can be caused by a user actuating an actuator or trigger on a handle of the applicator device. For a retropubic suspension procedure, operation 1806 can include advancing the needle through periosteum of the pubic bone, without the needle contacting the pubic bone.

The method 1800 can continue in operation 1808 by deploying the anchor from the needle while a distal portion of the needle is outside the first target tissue at the second point or region. This decouples the suture device from the applicator device. The method 1800 can continue in operation 1810 by retracting the needle through the passageway from the distal portion of the distal complex to the proximal portion of the distal complex. However, because the suture device is decoupled from the needle, the suture device is not retracted with the needle. Rather, after retracting the needle, the anchor remains external to the first target tissue at the second point, and a portion of the suture element extends through the passageway between the first point and the second point. For a retropubic suspension procedure, a portion of the suture element passes through the periosteum, but the anchor sits along and external surface of the periosteum. As previously described, this is expected to be advantageous because it reduces the amount of the suture device that is positioned within the periosteum, avoids contacting the bone, and provides a secure anchor point.

The method 1800 can continue in operation 1812 by securing a free end of the suture device to a second target tissue to provide support to the second target tissue. In some embodiments, this may be accomplished by piercing the second target tissue with a suture needle coupled to the suture element, at least partially elevating the second target tissue along the suture element toward the first target tissue, and retaining the second target tissue at the at least partially elevated position. The second target tissue can be retained at the at least partially elevated position by use of suture barbs and/or a suture locking element (e.g., a suture clip, such as any of the suture clips described herein). For a retropubic suspension procedure, operation 1812 can include securing the free end of the suture device to the periurethral vaginal wall. In some embodiments, the suture device can include a plurality of suture elements coupled to the anchor, as previously described. In such embodiments, operation 1812 can be repeated such that each of the suture elements is coupled to the second target tissue.

In some embodiments, the method 1800 can be repeated to deploy a plurality of suture devices secured between the first tissue structure and the second tissue structure. For example, the method 1800 can be repeated to deploy two, three, four, five, six, seven, eight, or more suture devices. In some embodiments, each of the suture devices can be deployed into the first target tissue (e.g., by repeatedly performing operations 1802-1810), and subsequently each of the suture devices can be secured to the second target tissue (e.g., by repeatedly performing operation 1812).

As one skilled in the art will appreciate, the foregoing procedure is expected to provide various advantages relative to conventional procedures. For example, the procedure is generally easier to carry out than prior art mesh or sling procedures and is expected to be less traumatic to the patient. Of course, as one skilled in the art, the present technology may in various embodiments provide other or additional advantages beyond those expressly described herein.

Conclusion

The above detailed description of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, any of the features of the intraocular shunts described herein may be combined with any of the features of the other intraocular shunts described herein and vice versa. Moreover, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions associated with intraocular shunts have not been shown or described in detail to avoid unnecessarily obscuring the description of the embodiments of the technology. Where the context permits, singular or plural terms may also include the plural or singular term, respectively.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method of anchoring a suture device, the method comprising:
   advancing an applicator device releasably carrying the suture device toward a first target tissue of the patient, wherein the suture device includes an anchor, a suture element, and an end region spaced apart from the anchor by the suture element, wherein the applicator device includes a distal complex having a proximal portion and a distal portion, the proximal portion having a needle carrying the anchor, and wherein the first target tissue is a first anatomical structure;

positioning the first target tissue at least partially within a gap in the distal complex between the proximal portion and the distal portion;

advancing the needle from the proximal portion toward the distal portion, wherein advancing the needle causes the needle to (a) enter the first target tissue at a first region adjacent the proximal portion, (b) create a passageway through the first target tissue, and (c) exit the first target tissue at a second region adjacent the distal portion, and wherein the needle carries the anchor and at least a portion of the suture element from the first region to the second region through the passageway as it advances;

with a distal portion of the needle outside the first target tissue at the second region, deploying the anchor from the needle;

retracting the needle through the passageway from the distal portion of the distal complex to the proximal portion of the distal complex, wherein, after retracting the needle, the anchor remains external to the first target tissue at the second region, a portion of the suture element extends through the passageway between the first region and the second region, and the end region of the suture device is not engaged with the first target tissue; and coupling the end region of the suture device to a second target tissue, wherein the second target tissue is a second anatomical structure that is a different type of tissue than the first anatomical structure.

2. The method of claim 1 wherein the first target tissue includes bone and periosteum, and wherein advancing the needle through the first target tissue includes advancing the needle through the periosteum without contacting the bone such that the first region, the second region, and the passageway are all located within the periosteum.

3. The method of claim 2 wherein, after retracting the needle, the anchor remains external to the periosteum and the portion of the suture element extends through the periosteum.

4. The method of claim 1 wherein the end region of the suture device includes a suture needle, and wherein coupling the end region of the suture device to the second target tissue comprises:

piercing the second target tissue with the suture needle;
at least partially elevating the second target tissue along the suture element toward the first target tissue; and
retaining the second target tissue in the at least partially elevated position.

5. The method of claim 4 wherein the suture element includes barbs, and wherein the second target tissue is retained in the at least partially elevated position by virtue of the barbs.

6. The method of claim 4 wherein retaining the second target tissue in the at least partially elevated position includes advancing a suture locking element over the suture element and securing the suture locking element to the suture element.

7. The method of claim 1 wherein the first target tissue is a periosteum, and wherein the second target tissue is a periurethral vaginal wall.

8. The method of claim 1 wherein the first target tissue is a sacrospinous ligament, and wherein the second target tissue is rectal tissue.

9. A system, comprising:
a suture device, having:
an anchor,
a suture element extending from the anchor element, and
an end region spaced apart from the anchor by the suture element; and
an applicator device configured to anchor the suture device in a first anatomical structure of a patient, and the applicator device comprising:
a proximal complex having a handle and an actuator,
a distal complex having a proximal portion and a distal portion, the proximal portion and the distal portion defining a gap therebetween configured to receive the first anatomical structure when the applicator device is positioned within the patient, and
a needle positioned within the proximal portion of the distal complex, wherein the needle is configured to releasably carry the anchor of the suture device;
wherein the applicator device is configured such that, upon actuation of the actuator, the needle advances from the proximal portion toward the distal portion across the gap, and
wherein, during operation, the applicator device is further configured to deploy the suture device through the first anatomical structure such that (i) the anchor is positioned external to the first anatomical structure, (ii) at least a portion of the suture element passes through the first anatomical structure, and (iii) the end region of the suture device is not engaged with the first anatomical structure such that it can be attached to a second anatomical structure that is a different type of tissue than the first anatomical structure.

10. The system of claim 9, further comprising a suture locking element, wherein the suture locking element is configured to be advanced over the free region of the suture device and secured thereto.

11. An applicator device configured to anchor a suture device in a target tissue of a subject, the applicator device comprising:
a proximal complex having a handle and an actuator;
a distal complex having a proximal portion and a distal portion, the proximal portion and the distal portion defining a gap therebetween configured to receive the target tissue of the subject;
a curved needle positioned within the proximal portion of the distal complex, wherein the curved needle is configured to releasably carry at least a portion of a suture device, the suture device having an anchor and a suture element,
wherein the applicator device is configured such that, upon actuation of the actuator, the curved needle advances from the proximal portion toward the distal portion across the gap along a curved path, and
wherein, during operation, the applicator device is further configured to deploy the suture device through the target tissue such that (i) the anchor is positioned external to the target tissue, and (ii) at least a portion of the suture element passes through the target tissue, and wherein the curved needle is configured to carry the anchor of the suture device from the proximal portion toward the distal portion across the gap, and wherein the curved needle is further configured to release the anchor after the curved needle has advanced across the gap.

12. The applicator device of claim 11 wherein the curved needle includes a hollow tip portion configured to hold the anchor of the suture device.

13. The applicator device of claim 12 wherein the hollow tip portion includes a slit configured to permit egress of the suture element of the suture device.

14. The applicator device of claim 11 wherein the distal portion includes a slot configured to receive the curved needle upon actuation of the actuator.

15. The applicator device of claim 11 wherein the proximal portion includes a slot configured to permit egress of the suture element from the proximal complex.

\* \* \* \* \*